(12) United States Patent
Goodspeed et al.

(10) Patent No.: US 9,613,003 B1
(45) Date of Patent: Apr. 4, 2017

(54) IDENTIFYING TOPICS IN A DIGITAL WORK

(75) Inventors: Joshua M. Goodspeed, Seattle, WA (US); Janna S. Hamaker, Seattle, WA (US); Adam J. Iser, Mercer Island, WA (US); Tom Killalea, Seattle, WA (US); Abhishek Patnia, Seattle, WA (US); Alla Taborisskaya, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 1090 days.

(21) Appl. No.: 13/433,028

(22) Filed: Mar. 28, 2012

Related U.S. Application Data

(63) Continuation-in-part of application No. 13/246,759, filed on Sep. 27, 2011, now Pat. No. 8,842,085.
(Continued)

(51) Int. Cl.
*G06F 17/27* (2006.01)
*G06F 3/00* (2006.01)
(Continued)

(52) U.S. Cl.
CPC .................................. *G06F 17/21* (2013.01)

(58) Field of Classification Search
USPC .............................................................. 704/9
See application file for complete search history.

(56) References Cited

U.S. PATENT DOCUMENTS

D146,109 S 12/1946 Jones
5,251,125 A 10/1993 Karnowski et al.
(Continued)

FOREIGN PATENT DOCUMENTS

CN 101309323 11/2008
JP 2002508543 3/2002
(Continued)

OTHER PUBLICATIONS

Coursey et al. "Using encyclopedic knowledge for automatic topic identification", 2009, In Proceedings of the Thirteenth Conference on Computational Natural Language Learning, CoNLL '09, pp. 210-218.*

(Continued)

*Primary Examiner* — Olujimi Adesanya
(74) *Attorney, Agent, or Firm* — Lee & Hayes, PLLC

(57) ABSTRACT

In some implementations, text is extracted from a digital work and a plurality of noun phrases are identified. The noun phrases are checked against a network accessible resource, such as an online encyclopedia, that includes a plurality of interlinked article entries. The noun phrases that have corresponding entries in the network accessible resource are included in a set of candidate topics. The candidate topics are ranked based, at least in part, on the links to and from each of the entries corresponding to the candidate topics. Candidate topics below a ranking threshold are removed from the set of candidate topics. Further, term frequency information for each candidate topic in relation to the digital work is compared against term frequency information for the candidate topic in a large corpus of textual works to remove candidate topics within a frequency difference threshold.

25 Claims, 21 Drawing Sheets

Related U.S. Application Data

(60) Provisional application No. 61/538,715, filed on Sep. 23, 2011.

(51) Int. Cl.
  *G06F 3/048* (2013.01)
  *G06F 17/00* (2006.01)
  *G06F 17/21* (2006.01)

(56) References Cited

U.S. PATENT DOCUMENTS

| | | | |
|---|---|---|---|
| 5,276,616 A | 1/1994 | Kuga et al. | |
| 5,339,391 A | 8/1994 | Wroblewski et al. | |
| 5,479,600 A | 12/1995 | Wroblewski et al. | |
| 5,636,350 A | 6/1997 | Eick et al. | |
| 5,644,692 A | 7/1997 | Eick | |
| 5,790,819 A | 8/1998 | Rosenburg et al. | |
| 5,820,386 A | 10/1998 | Sheppard, II | |
| 5,838,323 A | 11/1998 | Rose et al. | |
| 5,845,288 A | 12/1998 | Syeda-Mahmood | |
| 5,867,158 A | 2/1999 | Murasaki et al. | |
| 5,873,107 A | 2/1999 | Borovoy et al. | |
| 6,073,148 A | 6/2000 | Rowe et al. | |
| 6,211,856 B1 | 4/2001 | Choi et al. | |
| 6,331,867 B1* | 12/2001 | Eberhard | G06F 1/1626 715/824 |
| 6,377,281 B1 | 4/2002 | Rosenbluth et al. | |
| 6,397,211 B1* | 5/2002 | Cooper | G06F 17/30719 704/9 |
| 6,518,984 B1 | 2/2003 | Maeckel et al. | |
| 6,552,717 B2 | 4/2003 | Mailman | |
| 6,964,608 B1 | 11/2005 | Koza | |
| 7,130,885 B2* | 10/2006 | Chandra | G06Q 10/107 709/206 |
| 7,234,942 B2 | 6/2007 | Hu et al. | |
| 7,310,084 B2 | 12/2007 | Shitanaka et al. | |
| 7,401,286 B1* | 7/2008 | Hendricks | G06F 17/2235 715/203 |
| 7,421,660 B2 | 9/2008 | Charnock et al. | |
| 7,689,933 B1 | 3/2010 | Parsons | |
| 7,716,224 B2 | 5/2010 | Reztlaff, II et al. | |
| 7,778,890 B1 | 8/2010 | Bezos et al. | |
| 7,793,230 B2 | 9/2010 | Burns et al. | |
| 7,836,408 B1 | 11/2010 | Ollmann et al. | |
| 7,849,393 B1* | 12/2010 | Hendricks | H04N 5/4401 715/203 |
| 7,865,567 B1* | 1/2011 | Hendricks | G06Q 30/06 709/214 |
| 7,881,957 B1 | 2/2011 | Cohen et al. | |
| 7,930,393 B1 | 4/2011 | Baumback et al. | |
| 7,970,897 B1 | 6/2011 | Baumback et al. | |
| 8,041,595 B2 | 10/2011 | Robertson et al. | |
| 8,051,385 B1 | 11/2011 | Yawitz et al. | |
| 8,065,626 B2 | 11/2011 | Hoshino | |
| 8,078,985 B2 | 12/2011 | Sauermann | |
| 8,090,724 B1 | 1/2012 | Welch et al. | |
| 8,115,769 B1 | 2/2012 | Lymer et al. | |
| 8,135,389 B2 | 3/2012 | Forstall et al. | |
| 8,150,695 B1 | 4/2012 | Killalea et al. | |
| 8,171,432 B2 | 5/2012 | Matas et al. | |
| D662,507 S | 6/2012 | Mori et al. | |
| 8,262,445 B1 | 9/2012 | Spigner | |
| 8,325,974 B1 | 12/2012 | Killalea et al. | |
| 8,468,244 B2* | 6/2013 | Redlich | G06Q 10/06 705/50 |
| 8,589,399 B1* | 11/2013 | Lee et al. | 707/737 |
| 8,635,531 B2 | 1/2014 | Graham et al. | |
| 8,842,085 B1 | 9/2014 | Goodspeed et al. | |
| 9,158,741 B1 | 10/2015 | Hansen | |
| 2002/0059285 A1 | 5/2002 | Fukushima et al. | |
| 2002/0093496 A1 | 7/2002 | Gould | |
| 2003/0009459 A1 | 1/2003 | Chastain et al. | |
| 2003/0097636 A1* | 5/2003 | Cleveland | B42D 1/00 715/202 |
| 2003/0107178 A1 | 6/2003 | Weston | |
| 2003/0108854 A1 | 6/2003 | Chan | |
| 2003/0110162 A1* | 6/2003 | Newman | G06F 17/3071 |
| 2003/0122873 A1 | 7/2003 | Dieberger et al. | |
| 2003/0139210 A1 | 7/2003 | Raben | |
| 2004/0029085 A1 | 2/2004 | Hu et al. | |
| 2004/0078190 A1* | 4/2004 | Fass et al. | 704/7 |
| 2004/0095376 A1 | 5/2004 | Graham et al. | |
| 2005/0187910 A1 | 8/2005 | Kladko | |
| 2005/0283723 A1 | 12/2005 | Fish | |
| 2006/0047500 A1 | 3/2006 | Humphreys et al. | |
| 2007/0050712 A1 | 3/2007 | Hull et al. | |
| 2007/0192729 A1 | 8/2007 | Downs | |
| 2008/0039203 A1 | 2/2008 | Ackley et al. | |
| 2008/0040665 A1 | 2/2008 | Waldeck | |
| 2008/0077583 A1 | 3/2008 | Castro et al. | |
| 2008/0134033 A1 | 6/2008 | Burns et al. | |
| 2008/0138034 A1 | 6/2008 | Hiroi et al. | |
| 2008/0140412 A1 | 6/2008 | Millman et al. | |
| 2008/0163039 A1 | 7/2008 | Ryan et al. | |
| 2008/0235207 A1 | 9/2008 | Berkner et al. | |
| 2008/0243828 A1 | 10/2008 | Reztlaff et al. | |
| 2008/0294674 A1 | 11/2008 | Reztlaff, II et al. | |
| 2009/0055394 A1* | 2/2009 | Schilit et al. | 707/6 |
| 2009/0099996 A1* | 4/2009 | Stefik | G06F 17/30648 706/54 |
| 2009/0204609 A1* | 8/2009 | Labrou et al. | 707/5 |
| 2009/0293019 A1 | 11/2009 | Raffel et al. | |
| 2010/0076979 A1 | 3/2010 | Wang et al. | |
| 2010/0145687 A1* | 6/2010 | Huo et al. | 704/206 |
| 2010/0185689 A1* | 7/2010 | Hu et al. | 707/803 |
| 2010/0223292 A1 | 9/2010 | Bhagwan et al. | |
| 2010/0268124 A1 | 10/2010 | Hamilton et al. | |
| 2010/0299149 A1 | 11/2010 | Kurzweil et al. | |
| 2011/0010617 A1 | 1/2011 | Kim et al. | |
| 2011/0055691 A1 | 3/2011 | Carlen et al. | |
| 2011/0087955 A1 | 4/2011 | Ho et al. | |
| 2011/0105232 A1 | 5/2011 | Godfrey et al. | |
| 2011/0106807 A1* | 5/2011 | Srihari et al. | 707/739 |
| 2011/0167380 A1 | 7/2011 | Stallings et al. | |
| 2011/0179344 A1 | 7/2011 | Paxson | |
| 2011/0252045 A1* | 10/2011 | Garg | G06F 17/30705 707/750 |
| 2011/0261030 A1* | 10/2011 | Bullock | G06F 15/0283 345/204 |
| 2011/0321071 A1 | 12/2011 | McRae | |
| 2012/0078612 A1 | 3/2012 | Kandekar et al. | |
| 2012/0078613 A1 | 3/2012 | Kandekar et al. | |
| 2012/0079372 A1 | 3/2012 | Kandekar et al. | |
| 2012/0079422 A1 | 3/2012 | Hoshino | |
| 2012/0120078 A1 | 5/2012 | Hubbard | |
| 2012/0124505 A1 | 5/2012 | St. Jacques, Jr. | |
| 2012/0137246 A1* | 5/2012 | Pyo | G01C 21/362 715/776 |
| 2012/0166414 A1 | 6/2012 | Decker et al. | |
| 2012/0166634 A1 | 6/2012 | Baumback et al. | |
| 2012/0173659 A1 | 7/2012 | Thaxter et al. | |
| 2012/0179449 A1 | 7/2012 | Raskino et al. | |
| 2013/0074133 A1* | 3/2013 | Hwang | G06F 17/30038 725/93 |
| 2013/0124988 A1 | 5/2013 | Lettau | |
| 2013/0151954 A1* | 6/2013 | Ierullo | G06F 17/30861 715/254 |

FOREIGN PATENT DOCUMENTS

| | | |
|---|---|---|
| JP | 2005063283 | 3/2005 |
| JP | 2005259088 | 9/2005 |
| JP | 2008148077 | 6/2008 |
| JP | 2009129009 | 6/2009 |
| JP | 2010511936 | 4/2010 |

OTHER PUBLICATIONS

Nguyen et al, "Exploring Wikipedia and Text Features for Named Entity Disambiguation", In Intelligent Information and Database Systems, vol. 5991, pp. 11-20.*

(56) References Cited

OTHER PUBLICATIONS

Anastacio et al, Supervised Learning for Linking Named Entities to Knowledge Base Entries:, Nov. 14-15, 2011, In Proc. Text Analysis Conference (TAC2011), pp. 1-12.*
Mihalcea et al, "Wikify!: Linking Documents to Encyclopedic Knowledge", 2007, In CIKM 2007, pp. 1-9.*
Schonhofen, "Identifying document topics using the Wikipedia category network",2006, In Proc. of the 2006 IEEE/WIC/ACM International Conference on Web Intelligence (WI-06), 2006, pp. 471-480.*
Han et al, "A generative entity-mention model for linking entities with knowledge base", Jun. 19-24, 2011, In Association for Computational Linguistics, pp. 945-954.*
Office Action for U.S. Appl. No. 13/246,759, mailed on Jan. 17, 2014, Joshua M. Goodspeed, "Providing Supplemental Information for a Digital Work", 11 pages.
Office Action for U.S. Appl. No. 13/424,046, mailed on Oct. 7, 2013, Walter Manching Tseng, "Generating a Game Related to a Digital Work", 20 pages.
The Canadian Office Action mailed Dec. 12, 2011 for Canadian design application No. 142736, a counterpart foreign application of design U.S. Appl. No. 29/402,813, 1 page.
The Korean Office Action mailed Jan. 2, 2012 for Korean design application No. 30-2011-46560, a counterpart foreign application of design U.S. Appl. No. 29/402,813, 2 pages.
Office Action for U.S. Appl. No. 13/246,796, mailed on Mar. 27, 2014, Joshua M. Goodspeed, "Providing Supplemental Information for a Digital Work in a User Interface", 21 pages.
Office action for U.S. Appl. No. 13/424,046, mailed on Jun. 26, 2014, Tseng et al., "Generating a Game Related to a Digital Work", 23 pages.
The Japanese Office Action mailed Jun. 29, 2012 for Japanese design application No. 2011-23927, a counterpart foreign application of design U.S. Appl. No. 29/402,813, 3 pages.
The Indian Office Action mailed Aug. 14, 2014 for Indian design application No. 240305, a counterpart foreign application of design Pat. No. D. 674,810, 7 pages.
Office action for U.S. Appl. No. 13/246,798, mailed on Oct. 2, 2014, Goodspeed et al., "Navigating Supplemental Information for a Digital Work", 51 pages.
Office action for U.S. Appl. No. 13/246,798, mailed on Jan. 3, 2013, Goodspeed et al., "Navigating Supplemental Information for a Digital Work", 27 pages.
The PCT Search Report mailed Nov. 20, 2012 for PCT application No. PCT/US12/56634, 7 pages.
Hearst, "Information Visualization for Search Interfaces", Cambridge University Press, Sep. 2009, 41 pages.
Office action for U.S. Appl. No. 13/246,796, mailed on Feb. 15, 2013, Goodspeed et al., "Providing Supplemental Information for a Digital Work in a User Interface", 21 pages.
Givon, "Extracting Information from Fiction", Master of Science Thesis, University of Edinburgh, 2006, pp. 1-138.
Final Office Action for U.S. Appl. No. 13/246,796, mailed on Jan. 15, 2015, Joshua M. Goodspeed, "Providing Supplemental Information for a Digital Work in a User Interface", 27 pages.
Office Action for U.S. Appl. No. 13/431,838, mailed on Feb. 13, 2015, Joshua M. Goodspeed, "Identifying Entities in a Digital Work", 21 pages.
Office Action for U.S. Appl. No. 13/425,116, mailed on Nov. 17, 2014, Joshua M. Goodspeed, "Supplemental Information for a Digital Work", 17 pages.
The Japanese Office Action mailed Oct. 6, 2015 for Japanese patent application No. 2014-532016, a counterpart foreign application of U.S. Appl. No. 13/246,773, 7 pages.
Office action for U.S. Appl. No. 13/246,773mailed on Nov. 12, 2015, Goodspeed et al., "Visual Representation of Supplemental Information for a Digital Work", 23 pages.
Office action for U.S. Appl. No. 13/431,838 mailed on Nov. 13, 2015, Goodspeed, "Identifying Entities in a Digital Work", 43 pages.
Office action for U.S. Appl. No. 13/246,798 mailed on Nov. 4, 2015, Goodspeed et al., "Navigating Supplemental Information for a Digital Work", 59 pages.
Office Action for U.S. Appl. No. 13/425,116 mailed on Sep. 3, 2015, Goodspeed et al., "Supplemental Information for a Digital Work", 20 pages.
Office Action for U.S. Appl. No. 13/246,773, mailed on Feb. 26, 2015, Joshua M. Goodspeed, "Visual Representation of Supplemental Information for a Digital Work", 22 pages.
Walkenbach, "Excel 2010 Bible", Wiley, Massachusettes, 2010, pp. 418, 482.
The Japanese Office Action mailed Mar. 31, 2015 for Japanese patent application No. 2014-532016, a counterpart foreign application of U.S. Appl. No. 13/246,773, 10 pages.
The Extended European Search Report mailed Jul. 15, 2015 for European patent application No. 12833911.6, 6 pages.
Final Office Action for U.S. Appl. No. 13/246,798, mailed on May 29, 2015, Joshua M. Goodspeed, "Navigating Supplemental Information for a Digital Work", 68 pages.
Office Action for U.S. Appl. No. 13/424,046, mailed on Jul. 15, 2015, Walter Manching Tseng, "Generating a Game Related to a Digital Work", 26 pages.
The Chinese Office Action mailed Jan. 14, 2016 for Chinese patent application No. 201280046482.3, a counterpart foreign application of U.S. Appl. No. 13/246,773.
Office action for U.S. Appl. No. 13/424,046, mailed on Feb. 26, 2016, Tseng et al., "Generating a Game Related to a Digital Work", 14 pages.
Office action for U.S. Appl. No. 13/431,838, mailed on Mar. 10, 2016, Goodspeed et al., "Identifying Entities in a Digital Work", 42 pages.
Office action for U.S. Appl. No. 13/246,773, mailed on May 13, 2016, Goodspeed et al., "Visual Representation of Supplemental Information for a Digital Work", 25 pages.
Office action for U.S. Appl. No. 13/425,116, mailed on May 6, 2016, Goodspeed et al.,"Supplemental Information for a Digital Work", 22 pages.
Wikipedia, "Index (Publishing)", Wikipedia entry, Retreived from <<https://web.archive.org/web/20110205135612/http:en.wikipedia.org/wiki/Index_(publishing)>>, Avaiable as early as Feb. 2011, 4 pages.
The Chinese Office Action mailed Aug. 3, 2016 for Chinese patent application No. 201280046482.3, a counterpart foreign application of U.S. Appl. No. 13/246,773.
Office action for U.S. Appl. No. 13/431,838, mailed on Jul. 5, 2016, Goodspeed et al., "Tidentifying Entities in a Digital Work", 43 pages.
Office action for U.S. Appl. No. 13/246,773, mailed on Aug. 9, 2016, Goodspeed et al., "Visual Representation of Supplemental Information for a Digital Work", 22 pages.
Morse, "Document Visualization", at http://www.itl.nist.gov/iaui/vvrg/emorse/papers/soa/DocumentVisualization/htm, retrieved on Feb. 7, 2013, 2009, 39 pages.
Office action for U.S. Appl. No. 13/246,798, mailed on Jul. 18, 2013, Goodspeed et al., "Navigating Supplemental Information for a Digital Work", 31pages.
Office action for U.S. Appl. No. 13/246,796, mailed on Jul. 19, 2013, Goodspeed et al., "Providing Supplemental Information for a Digital Work in a User Interface", 26 pages.

* cited by examiner

1200

1202

RAW TEXT:   1204   1206
The quick brown fox jumped over the lazy dog. The lazy dog sat in the sun.

1208

TOKENS:   1210   1212 1214 1216

| | | | |
|---|---|---|---|
| The | 0 | 0 | 2 |
| quick | 1 | 4 | 8 |
| brown | 2 | 10 | 14 |
| fox | 3 | 16 | 18 |
| jumped | 4 | 20 | 25 |
| over | 5 | 27 | 30 |
| the | 6 | 32 | 34 |
| lazy | 7 | 36 | 39 |
| dog | 8 | 41 | 43 |
| . | 9 | 44 | 44 |
| The | 10 | 46 | 48 |
| lazy | 11 | 50 | 53 |
| dog | 12 | 55 | 57 |
| sat | 13 | 59 | 61 |
| in | 14 | 63 | 64 |
| the | 15 | 66 | 68 |
| sun | 16 | 70 | 72 |
| . | 17 | 73 | 73 |

1218

ANNOTATIONS:   1222 1224   1220

| | | |
|---|---|---|
| 0 | 10 | Sentence |
| 10 | 8 | Sentence |
| 0 | 4 | Noun Phrase // The quick brown fox |
| 4 | 1 | Verb Phrase // jumped |
| 6 | 3 | Noun Phrase // The lazy dog |
| 0 | 1 | POS DT // determiner: The |
| 2 | 1 | POS JJ // adjective: brown |
| 10 | 1 | POS JJ // adjective: lazy |
| 16 | 1 | POS NN // noun: sun |

IDENTIFYING TOPICS IN A DIGITAL WORK

CROSS-REFERENCE TO RELATED APPLICATIONS

This application is a continuation-in-part of, and claims priority to, U.S. patent application Ser. No. 13/246,759, filed Sep. 27, 2011. This application claims the benefit of U.S. Provisional Patent Application No. 61/538,715, filed Sep. 23, 2011. The above-listed applications are incorporated herein by reference in their entireties.

BACKGROUND

The continued proliferation of digital works has led to an increase in the availability of such works, as well as an increase in the availability of electronic devices and applications used for consuming these works. For instance, users consume digital works, such as electronic books (eBooks), digital videos, digital songs, digital images, and the like, on an assortment of electronic devices. As the number of digital works and devices for consuming digital works continues to increase, users are ever more interested in enhancing their experiences while consuming these works.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 12 illustrates an example framework for determining tokens and annotations from raw text according to some implementations.

DETAILED DESCRIPTION

Figure 1:
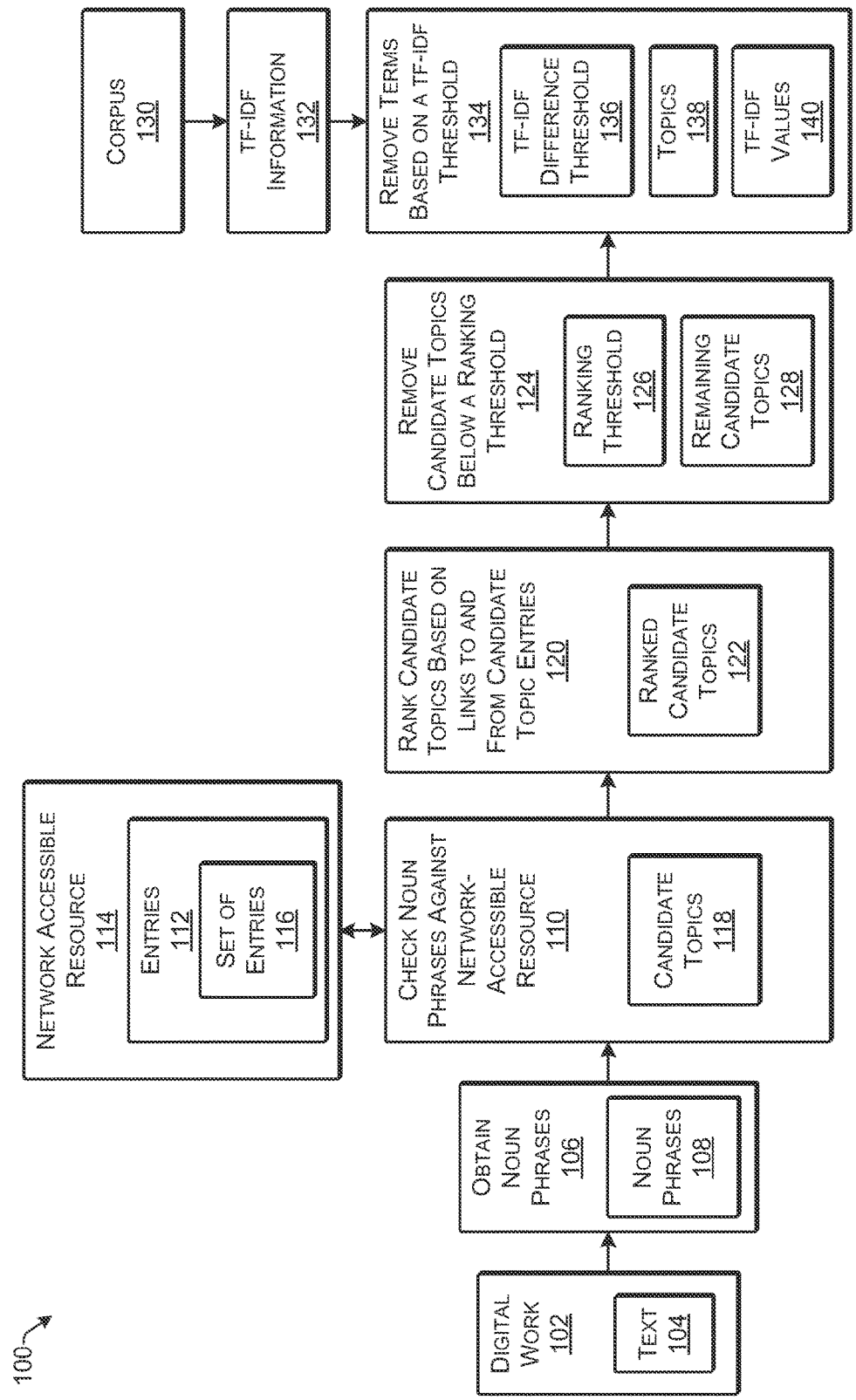
FIG. 1 illustrates an example framework of a topic generator for identifying topics related to a digital work according to some implementations.

This disclosure includes techniques and arrangements for identifying topics in a digital work, such as a digital work that includes textual content or that has textual content associated therewith. For example, for a given digital work, implementations herein derive a set of topics from the text of the digital work that relate, at least in part, to the overall subject of the digital work.

In some examples, the text is extracted from the digital work and some or all of the noun phrases contained in the text are identified. The identified noun phrases may be checked against a network accessible resource, such as a website or online encyclopedia that includes interlinked information on a plurality of topics or subjects. As one example, the network accessible resource may be the Wikipedia® website (wikipedia.org), or a mirror site thereof, which is an example of a website that includes a plurality of interlinked entries on a plurality of different topics. Thus, the Wikipedia® website or other online wiki-type sites provide an example of a network accessible resource that is searchable for a plurality of article entries on a plurality of topics. For instance, a wiki-type site may include a website whose users can add, modify, or delete the content thereof, such as through use of a web browser, sometimes using a simplified markup language or a rich-text editor. Wiki-type sites may typically be powered by wiki software and are often created collaboratively by multiple users. Examples include online encyclopedia sites, community websites, corporate intranets, knowledge management systems, and note-taking sites. In some examples, entry of the network accessible resource may include one or more hyperlinks in the text of the entry to one or more other article entries included in the network accessible resource. Other examples of suitable network accessible resources may include Shelfari® (shelfari.com) and IMDb® (Internet Movie Database) (imdb.com), as well as other online encyclopedias, wikis, online dictionaries, and the like. Accordingly, the network accessible resource herein may include a reference site, such as IMDb®, that includes information related to a number of different topics in digital works, which may include characters, themes, places, and the like. Further, some examples of network assessable resources may include crowd-sourced information sites, which may allow a community of users to add to the general knowledge base provided by the site. For example, wiki sites and a variety of other types of sites, such as Shelfari® allow users to add content with various levels of control, peer review, and the like. Thus, the network accessible resource accessed using the processes and techniques herein may include one or more sites that may contain entries corresponding to a noun phrase identified in the text of the digital work. The noun phrases that have corresponding entries in the network accessible resource are considered to be candidate topics, while those noun phrases for which corresponding entries cannot be located are removed from further consideration.

Some implementations herein may apply a ranking technique to rank the candidate topics based at least in part according to an analysis of links to and from each entry and the other entries in the network accessible resource that correspond to the other candidate topics. Thus, in some examples herein, the links to and from other entries provide an indication of the relatedness or connectedness of a particular entry. Accordingly, information on links between the article entries for the candidate topics may be employed to form a connected graph having edges from one linked or connected entry to another.

As an illustrative example, suppose that a plurality of noun phrases are obtained from a digital work on computer science. A search for each of the noun phrases in the network accessible resource may result in identification of a plurality of entries of the network accessible resource that match or correspond to respective ones of the noun phrases. For instance, suppose that one of the noun phrases is "Turing Machine." The network accessible resource is searched for an entry that is directed to or otherwise contains information related to "Turing Machine." If such a corresponding entry is located, "Turing Machine" is included as a candidate topic for further consideration. Thus, the noun phrases for which articles or entries are located in the network accessible resource that include information related to the respective noun phrases are considered to be the candidate topics for the digital work.

In addition, links between the article entries corresponding to the noun phrases may indicate connectedness between candidate topics. Accordingly, the linking between entries may provide indications such as that the candidate topics "Turing Machine," "Alan Turing" and the "Halting Problem" all point to or link to the candidate topic "Automata Theory," which may be the specific subject of the particular digital work. However, this type of linking may also indicate that the topic "Cambridge" is related to "Alan Turing" and "Charles Babbage," while "Cambridge" may not be substantially related to "Automata Theory," which may be the core or primary subject of the digital work in this example. Accordingly, implementations herein attempt to identify topics that have relevance to the primary subject of the digital work by determining the contribution that a candidate topic makes to the other candidate topics. For example, given a graph of Wikipedia® entries corresponding to candidate topics in a digital work, the determination of which candidate topics to retain out of a plurality of candidate topics may depend not only on the number of article entries that link to a particular article entry, but also on the contribution or links of the particular article entry to entries corresponding to other candidate topics identified in the digital work.

Continuing the example discussed above, consider the case of "Alan Turing" and "Charles Babbage" as two candidate topics linking to "Cambridge" as a third candidate topic. The entry on "Cambridge" may not link back to the entries on "Alan Turing" or "Charles Babbage," and further, the entry on "Cambridge" may not link to the entries on any other candidate topics such as "Finite-State Machine" or the "Halting Problem." This lack of contribution to the plurality of computer science terms found in the digital work may be taken as an indication that the term "Cambridge" is not particularly relevant to the core subject of the digital work, despite occurring in a number of locations in the digital work (such as due to Cambridge being associated with several contributing scientists).

Accordingly, some examples assign ranks to candidate topics based in part on an analysis of links to the entry associated with each candidate topic. Any of various link analysis ranking techniques may be applied, such as the PageRank® algorithm, or other suitable link analysis algorithms and processes, for assigning a link-based rank to each topic. Thus, the links to a particular entry corresponding to a particular topic from other entries corresponding to other topics may be considered during ranking of the candidate topics.

Additionally, the contribution of a particular topic to other topics in the digital work may also be considered. This may be determined by calculating a contribution based on an analysis of links from an entry of a candidate topic to the other entries corresponding to the other candidate topics. A link analysis algorithm may also be adapted for making this determination. Thus, the candidate topics may be ranked based on the values of incoming and outgoing links of corresponding entries, and those candidate topics having a rank below a certain ranking threshold may be pruned or otherwise removed from consideration. Further, other techniques may also be used to rank the connectedness of candidate topics. As one example, the ranking of the candidate topics may be based merely on the number of incoming and outgoing links for each candidate topic entry. Other variations will also be apparent to those of skill in the art in view of the disclosure herein.

Furthermore, in some examples, a term frequency-inverse document frequency (tf-idf) value may be calculated for each candidate topic to further refine the number candidate topics for a digital work. For example, a very large corpus of textual works (e.g., thousands or hundreds of thousands of textual works) may be parsed into n-grams, e.g., one-word n-grams, two-word n-grams, three-word n-grams, four-word n-grams, and five-word n-grams. The frequency of occurrence of each n-gram in the corpus may be determined and normalized based on inverse document frequency. The frequency of the candidate phrases in the instant digital work may then be compared with the frequency of those candidate phrases in the works of the overall corpus using tf-idf values. Candidate phrases having a tf-idf value that differs from the tf-idf value for that phrase in the corpus by less than a certain tf-idf threshold may be removed from consideration since they are likely common phrases that do not bear much importance to the subject of the digital work. The candidate topics that remain may be designated as the set of "topics" for the instant digital work.

In some implementations, the set of topics derived from a digital work may be utilized or designated as objects for providing supplemental information. Thus, a topic object may be created for each topic identified in the digital work for associating supplemental information with the object. The objects are able to be selected by a user to obtain supplemental information about the selected topic during consumption of the digital work. As one example, when a user selects a topic object from the text of the digital work, the location of each occurrence of the topic in the digital work (or in other works) may be displayed to the user. Further, or alternatively, content related to the selected topic object may be displayed or accessed in response to selection of the topic object. For example, descriptive content, location information, or other content related to each object identified in a digital work may be provided as supplemental information to supplement the digital work. Thus, a user may select an object, such as by selecting one or more words from a page in a displayed digital work to view the supplemental information related to the selected object.

Accordingly, topics, as well as other types of named entities recognized in the digital work, such as characters, people, places, organizations, and so forth, may be identified automatically as objects, and supplemental information related to the identified objects may be provided to an electronic device to supplement the digital work. A user may access the supplemental information during consumption of the digital work to obtain more information related to a selected object selected from a displayed digital work. As one example, suppose that the user is reading an electronic book (eBook) and encounters a topic for which the user would like to obtain more information. The user may select the topic from the displayed text of the eBook. In response to the selection, the device may access the supplemental information for that topic to present a user interface that displays a visual representation of other locations or occurrences within the eBook where the topic also appears. Thus, the user may employ the user interface to refer to another location in the eBook to access other locations where the selected topic is discussed. For example, the user interface may be further navigated to present excerpts from the digital work of one or more other occurrences at which the topic appears, along with surrounding text. Additionally, or alternatively, prestored content such as an excerpt of an article, essay, commentary, discussion or other composition drawn from an authoritative source, such as Wikipedia®, or other network accessible resource, may be included with the supplemental information to provide a description, explanation or definition of the selected object.

In addition, during initial processing of a digital work, a digital work provider may parse the text of the digital work into tokens corresponding to at least one of words or punctuation marks in the text. The text may be further parsed into annotations corresponding to noun phrases, verb phrases, other parts of speech, sentences, paragraphs, chapters, etc., which are each made up of one or more of the tokens. Locations may be associated with each token and/or annotation. As an example, the locations for the tokens may be determined based on an offset of each token from the beginning of the text of the digital work or other identified position in the text of the digital work. Additionally, or alternatively, the location of a token within a digital work may be identified or specified using other location identification techniques. For instance, the location of each token may be identified according to the coordinates of a token on a page, such as x-y coordinates of each token on a page or within an image. Further, the locations of the annotations, and thereby the topics and the objects, may be based, at least in part, on the locations of the tokens.

For discussion purposes, some example implementations are described in the environment of determining a plurality of topics in a digital work for providing supplemental information. However, the implementations herein are not limited to the particular examples provided, and may be extended to identifying topics for numerous other purposes, as will be apparent to those of skill in the art in light of the disclosure herein.

Example Framework

FIG. 1 illustrates an example framework 100 for identifying topics related to a digital work 102 according to some implementations. In some examples, the digital work 102 may be an electronic book (eBook) having one or more pages of text. An electronic device (not shown in FIG. 1) may display the text of the eBook and also any illustrations, images, tables, maps, or graphic elements that might be contained in the eBook. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed caption transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and other multi-media content, as described additionally below.

Implementations herein include arrangements and techniques for identifying topics contained in or associated with a digital work. One or more of the topics identified in the digital work may be designated as an object for having supplemental information associated therewith. For example, an object may be a term identified in the digital work as being of possible interest to a reader, such that a reader may desire to obtain additional or supplemental information related to the particular object. Further, implementations herein utilize automated techniques for locating and identifying topics and other entities in the digital work to designate as objects to have supplemental information associated with the designated objects.

In the example of FIG. 1, the digital work 102 includes text 104, which may be any type of textual content associated with the digital work 102. For example, in the case of eBooks or other textual digital works, the text 104 may simply be the text of the digital work 102. In the case that the digital work is a song, the text may be the lyrics of the song. Additionally, in the case that the digital work is a movie, TV show, or the like, the text may be closed captioning transcripts, a screenplay, or so forth.

As indicated at 106, a plurality of distinct noun phrases 108 may be obtained from the text 104 of the digital work 102, with each noun phrase 108 including one or more words. Further, as described additionally below, prior to obtaining the noun phrases 108, the text 104 may be parsed into a plurality of tokens, with each token corresponding to at least a word or a punctuation mark. Annotations, such as noun phrases, verb phrases, and other parts of speech, as well as sentences, paragraphs, chapters, and so forth, may be recognized in the parsed text, with each annotation being made up of one or more tokens.

As indicated at 110, some or all of the noun phrases 108 identified in the digital work 102 may be checked against entries 112 in a network accessible resource 114, such as a website. As discussed above, in some examples, the network accessible resource may be an online encyclopedia website, a dictionary website, or other reference website. In some examples, the network accessible resource 114 may be searched for an entry 112 that corresponds to a respective noun phrase 108 to identify a set 116 of one or more entries that correspond to one or more of the noun phrases 108. For example, an entry 112 may be an article, discussion, definition, description or other type of content or information related to the noun phrase 108 to which it corresponds. Further, in some examples, synonymous noun phrases 108 may be recognized and associated with one another by either the network accessible resource 114, or may be recognized and associated with one another prior to searching the network accessible resource, such as based at least in part on lists or databases of synonyms, or the like. The noun phrases 108 that correspond to a respective entry in the set 116 of entries in the network accessible resource 114 may be retained as candidate topics 118, while those noun phrases 108 that do not correspond to any entry 112 in the network accessible resource 114 may be pruned or otherwise removed or excluded from consideration as a candidate topic.

At 120, the candidate topics 118 are ranked based on links to and from the candidate topic entries in the network accessible resource 114 to obtain ranked candidate topics 122. For example, the links to and from each of the entries in the set 116 of entries corresponding to the candidate topics 118 may be determined. Accordingly, the candidate topics 118 may be ranked based at least in part on the links between the entries in the set 116 of entries. For example, a link analysis may be performed to weight each of the links to determine the ranking of the candidate topics. The PageRank® algorithm is one example of a suitable algorithm that may be used to determine a weight for each of the links. Accordingly, in some instances, a page ranking of each of the entries corresponding to the candidate topics may be determined based, at least in part, on a probability of being directed to a particular entry of the set of entries 116 by selecting a random link in another entry in the set of entries 116, in accordance with a conventional recursive page ranking technique. However, implementations herein are not limited to any particular link analysis or ranking technique, and may employ any other suitable link analysis algorithm, or other technique for determining connectedness of the candidate topic entries. For instance, in some cases, the ranking may be based, at least in part, on the number of links to and from each of the entries in the set 116 of entries, such as the number of incoming links and the number of outgoing links to entries for other candidate topics in the set 116 of entries.

At 124, ranked candidate topics 122 that are ranked below a ranking threshold 126 are pruned or otherwise removed from consideration to leave a set of remaining candidate topics 128. For example, the ranking threshold 126 may be established based on empirical information or other techniques. The actual value of the ranking threshold 126 may vary depending on the type of link analysis used, the ranking technique, the degree of connectedness desired between the topics, and the number of topics permitted to be established for a digital work. For instance, in implementations in which each of the candidate topics is assigned a page rank percentage, the ranking threshold value may be based on a cutoff percentage that results in pruning any candidate topic having a page rank percentage that is less than a specified percentage. The ranking threshold value may be controlled to control the amount of connectedness between the candidate topics. For example, if the ranking threshold value 126 is higher, then the remaining candidate topics 128 are likely to be more highly connected. A tradeoff is that a higher ranking threshold 126 may result in removal of candidate topics that are not so highly connected, but still relevant to the core subject of the digital work.

In addition to eliminating candidate topics based on lack of connectedness, candidate topics may also be removed based on being mere frequently occurring or common topics that appear often in many digital works. As mentioned above, term frequency-inverse document frequency (tf-idf) information may be determined from a corpus 130 of textual works. As one example, the corpus may include a large number of the digital works contained in a library of a digital work provider. Accordingly, thousands, hundreds of thousands, or more, textual works may be parsed into n-grams, such as 1-grams, 2-grams, 3-grams, 4-grams, 5 grams, etc., and the tf-idf for these n-grams may be determined over the corpus 130 as tf-idf information 132. Thus, the tf-idf information may indicate the relative frequency of occurrence of a particular phrase over the corpus 130, and may provide an indication of how common certain phrases appear in the language of the corpus.

As indicated at 134, those remaining candidate topics 128 below a certain tf-idf difference threshold 136 may be pruned from the remaining candidate topics 128 to arrive at the topics 138. For example, a tf-idf value 140 may be calculated for each phrase of the remaining candidate topics 128, and compared with the tf-idf information 132 for the corpus 130. If the comparison of the tf-idf information 132 with the tf-idf values 140 shows that a frequency of occurrence of a particular candidate topic is not substantially different in the digital work 102 from the corpus 130 as a whole, then that particular candidate topic may be pruned and removed from consideration. Thus, the tf-idf information comparison assists in eliminating topics that are not discussed much in the digital work 102, and therefore are probably not strongly related to the main subject of the digital work 102.

Similar to the ranking threshold 126 discussed above, the value of the tf-idf difference threshold 136 may be controlled such that a higher value ensures that topics are more relevant, to the core subject of the digital work, but the higher value as incurs a greater risk of pruning a topic that is relevant but not discussed frequently in the digital work. Further, while the example above describes pruning based on the ranking threshold 126 at 124, and subsequently pruning based on the tf-idf difference threshold 136 at 134, the order of these operations may be reversed and/or these operations may be performed together or contemporaneously. Further, in some examples, either or both of these operations may by skipped or not performed.

In some examples, some or all of the framework 100 of FIG. 1, as well as the other frameworks and processes discussed herein, may be executed by one or more computing devices, such as one or more computing devices of a digital work provider. However, some or all of the framework 100 of FIG. 1 may alternatively be executed by one or more computing devices of one or more other entities.

Additionally, implementations herein may identify objects from the topics 138 identified in the digital work 102, as discussed below. In some examples, the objects may have supplemental information associated with them, such as location information and/or content obtained from a network accessible resource or other external source. For example, an excerpt of a Wikipedia® article, a description from Shelfari®, information from IMDb®, or other supplemental content related to an object may be associated with the object. As another example, the identified objects may be used for various other purposes, such as to provide a list of topics in a digital work to various types of websites, discussion forums, fan pages, and so forth. Accordingly, implementations herein are not limited to any particular use for the topics and objects identified in a digital work.

Example Processes

Figure 2:
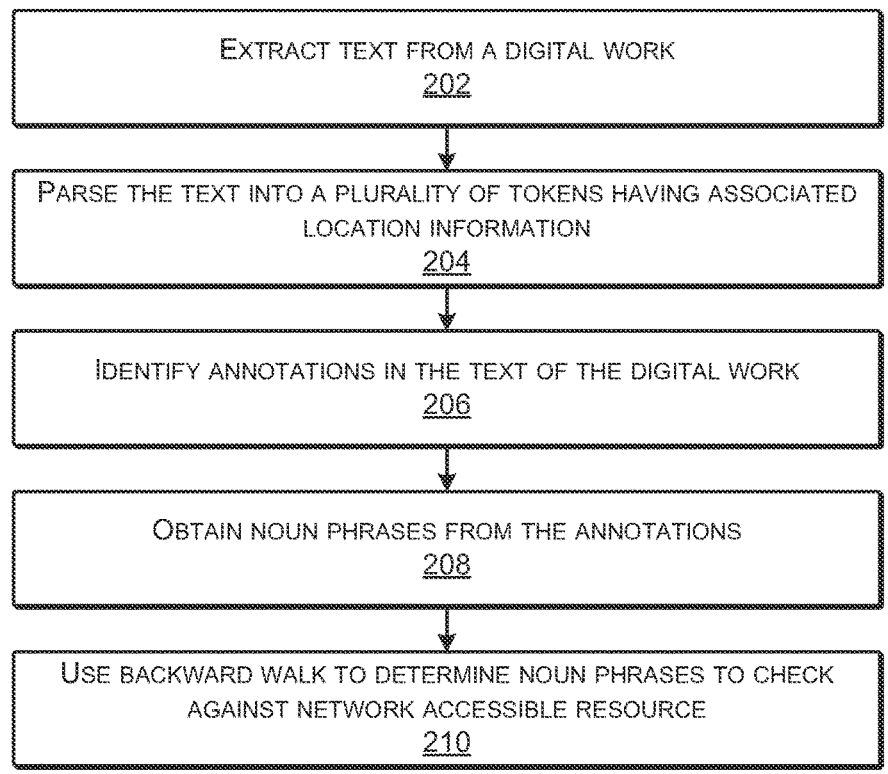
FIG. 2 is a flow diagram illustrating an example process for obtaining noun phrases from a digital work according to some implementations.

FIG. 2 is a flow diagram illustrating an example process 200 for obtaining noun phrases from a digital work 102, which may correspond to block 106 discussed above with respect to FIG. 1 in some implementations. The process of FIG. 2 (as well as the other processes described herein) is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

In some examples, the process 200 of FIG. 2 may be executed by one or more computing devices, such as one or more computing devices of a digital work provider. However, the process 200 of FIG. 2 may alternatively be executed by one or more computing devices of one or more other entities.

At 202, the process extracts text from a digital work. For example, a computing device performing the process 200 may receive a digital work in a particular format and extract the raw text from the digital work.

At 204, the process parses the text into a plurality of tokens, with each token corresponding to at least a word or a punctuation mark. Further, each token may have location information associated therewith that indicates the location of the token within the digital work.

At 206, the process may identify parts of speech, such as nouns, noun phrases, verb phrases, sentences, paragraphs, etc., which may be referred to as "annotations." Each annotation may have an identifiable location within the digital work, such as based on the location of one or more tokens that make up each annotation. Additional examples of parsing the text into tokens and/or annotations are discussed below with respect to FIGS. 11-13.

At 208, the process obtains the noun phrases from the annotations identified in the digital work. For example, the process may extract all noun phrases of one word or more identified in the digital work.

At 210, the process may breakdown the noun phrases to establish a set of noun phrases to check against the network accessible resource. For example, the noun phrases identified during generation of the annotations may be a compound noun phrases. Accordingly, when a noun phrase includes more than one word, implementations herein may employ a backwards walk through each noun phrase to identify additional noun phrases that may be used to search for entries in the network accessible resource.

Figure 3:
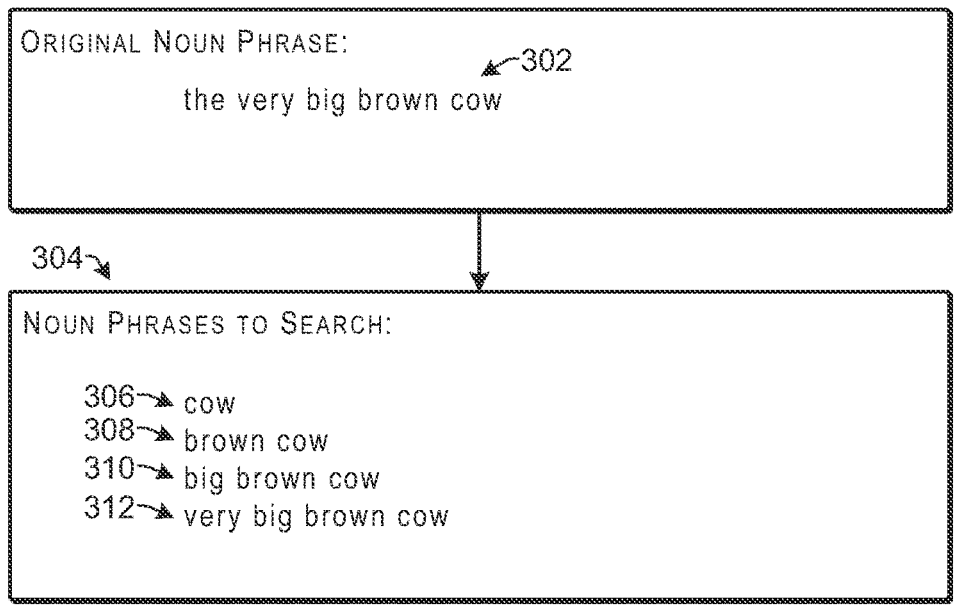
FIG. 3 illustrates an example of determining noun phrases to check against a network accessible resource according to some implementations.

FIG. 3 illustrates an example of determining noun phrases to check against a network accessible resource according to some implementations. In this example, the original noun phrase 302 obtained from the digital work may be "the very big brown cow." Accordingly, a backwards walk may be used to break down the original noun phrase 302 into a plurality of smaller noun phrases 304 to also search for in the network accessible resource, with the backwards walk stopping at determiners ("the" in this example). Thus, noun phrases 304 yielded from the original noun phrase 302 in this example are "cow" 306, "brown cow" 308, "big brown cow" 310, and "very big brown cow" 312. Accordingly, each of these noun phrases 306-312 may be searched in the network accessible resource to determine whether there is a corresponding article entry.

Figure 4:
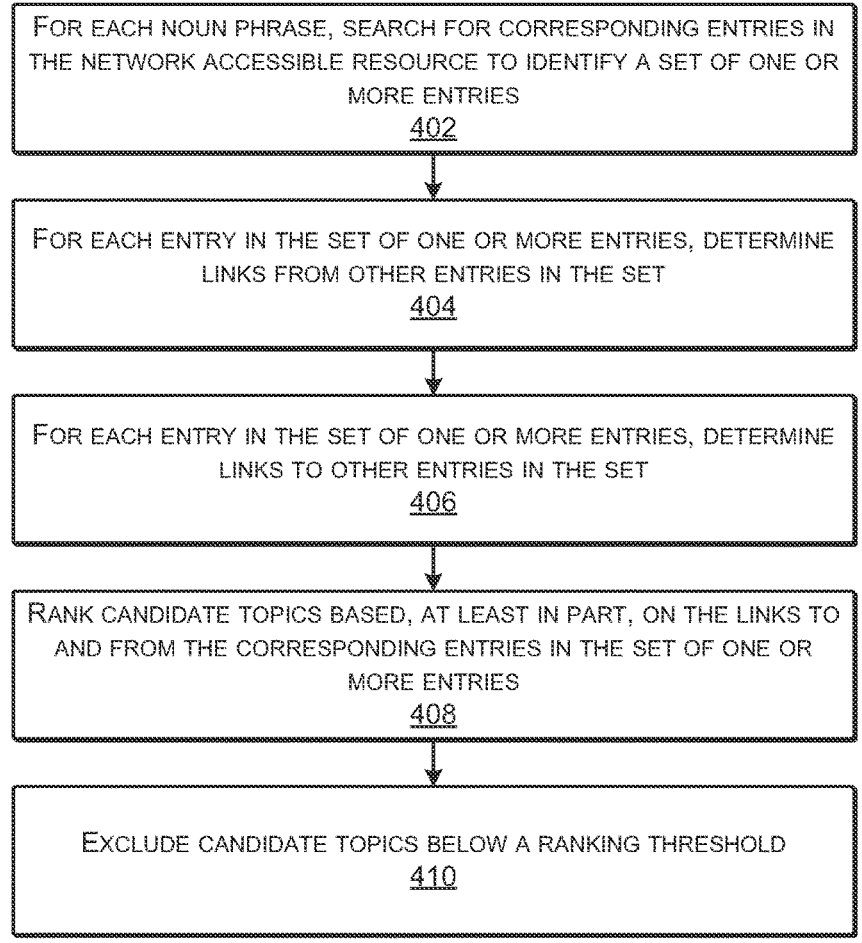
FIG. 4 is a flow diagram illustrating an example process for generating a set of candidate topics by checking noun phrases against entries in a network accessible resource according to some implementations.

FIG. 4 is a flow diagram illustrating an example process 400 for generating ranked topics according to some implementations. The process 400 may correspond to blocks 110, 120 and 124 of the framework 100 of FIG. 1, and may be performed by a computing device such as the computing device of a digital work provider or other entity.

At 402, for each noun phrase obtained from the digital work, the process searches for article entries in the network accessible resource. For example, the process may automatically search the network accessible resource for one or more entries that correspond to a particular noun phrase of the plurality of noun phrases obtained from the digital work as described above with reference to FIGS. 2 and 3 to identify a set of one or more entries. In some cases, a match is determined when an entry in the network accessible resource has a title that substantially matches the noun phrase being searched (or is a synonym thereof). However, in other cases a match is determined when an entry in the network accessible resource merely includes a discussion related to the noun phrase being search. In some cases, multiple entries may be located that correspond to a single noun phrase, and, for instance, the process may select an entry that appears most relevant to the noun phrase, such as by selecting the entry that includes the largest number of occurrences of the noun phrase in the entry, or the like. Further, in other cases, multiple noun phrases may match a single entry, and the process may further consider whether the multiple noun phrases are synonymous or related to each other, such as by referring to a list of synonyms, or other information external to the digital work. Each article entry in the network accessible resource determined to correspond to (e.g., as a match for) one of the noun phrases may be referred to as a candidate topic entry.

At 404, for each candidate topic entry in the set of one or more entries, the process determines links from other entries in the set of one or more entries. For example, the process identifies links from other candidate topic entries in the set to the particular entry (i.e., incoming links that link to the particular candidate topic entry). Accordingly, the process may determine incoming links for each candidate topic entry identified in the network accessible resource from other candidate topic entries.

At 406, for each candidate topic entry in the set of one or more entries, the process identifies outgoing links to other candidate topic entries in the set of one or more entries. For example, the process may examine the hyperlinks present in a particular candidate topic entry to determine if any are directed to other candidate topic entries in the set of one or more entries.

At 408, the process ranks the candidate topics based, at least in part, on the incoming links from other candidate topic entries and the outgoing links to other candidate topic entries in the set of one or more entries. For example, a link analysis may be performed to weight each of the incoming links and the outgoing links to determine the ranking of the candidate topics. As mentioned above, the PageRank® algorithm is one example of a suitable algorithm that may be used to determine a weight for each of the links. However, implementations herein are not limited to any particular link analysis technique, and may employ any other suitable link analysis algorithm, or other technique for determining connectedness of the candidate topic entries. Further, in some cases, the ranking may be based merely on the number of links to and from each of the candidate topic entries, rather than a weighting of the links or entries.

At 410, the process prunes those candidate topics having a rank below a ranking threshold. For example, the ranking will indicate a connectedness between the candidate topics based on the connectedness of the candidate topic entries in the network accessible resource. As mentioned above, the ranking threshold may be established at a level to maintain topics that are related to the subject matter of the digital work without including a large number of topics that are not substantially related. The actual value of the threshold may vary depending on the type of link analysis used, the connectedness ranking technique, and the number of topics permitted to be established for a digital work. Additionally, in some cases, the threshold may be established at least in part on a maximum number of candidate topics permitted per digital work such as 50, 100, etc., and/or the threshold value may be proportional, at least in part, to a length of the digital work or other quantifiable value. Further, in some implementations, such as when each of the candidate topics is assigned a page rank percentage, the ranking threshold value may be based on a threshold percentage that results in pruning any candidate topic having a page rank percentage that is less than a specified percentage.

Figure 5:
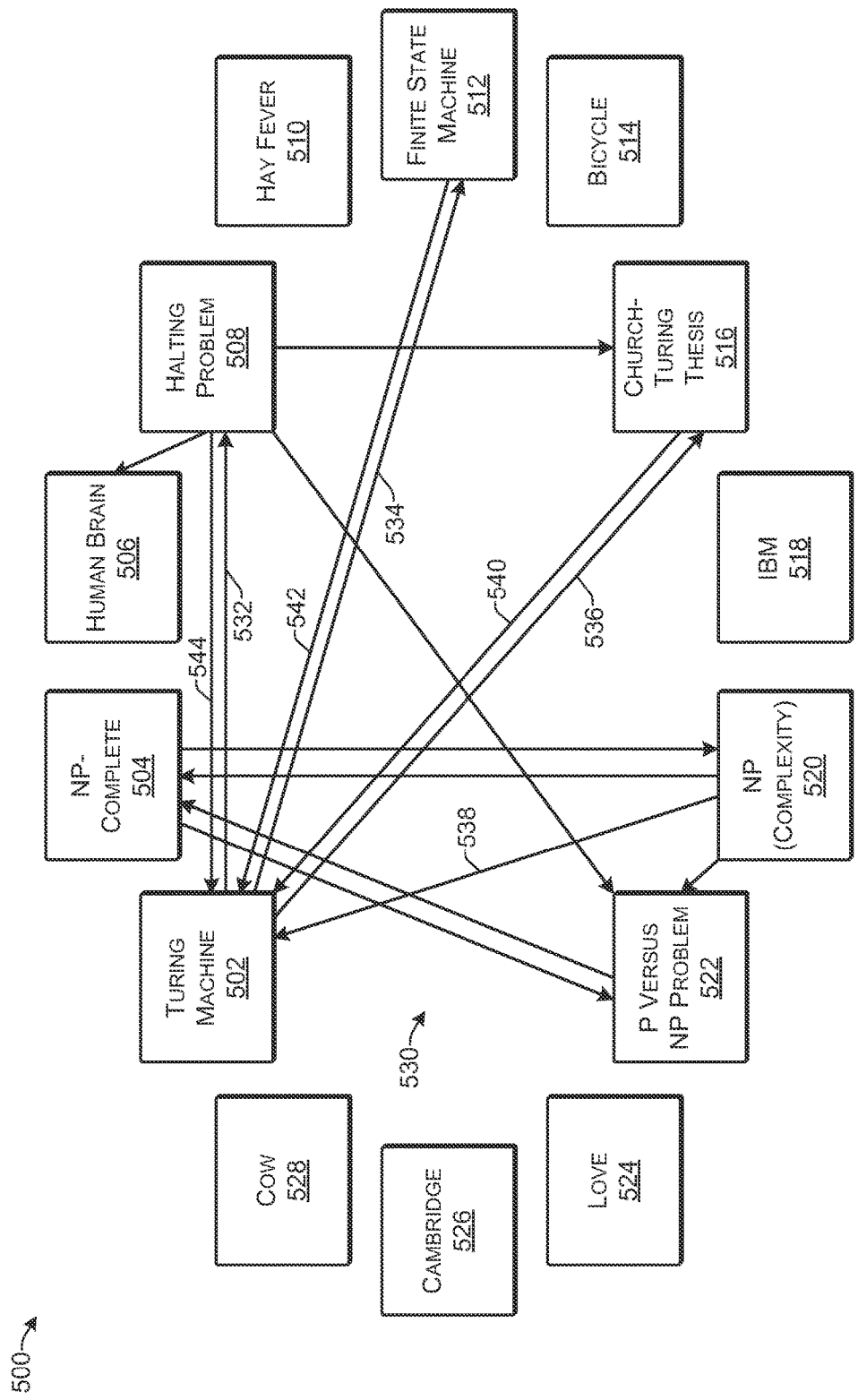
FIG. 5 illustrates an example graph including links between candidate topic entries according to some implementations.

FIG. 5 illustrates an example graph 500 of links between candidate topics according to some implementations. In this example, for an instant digital work being analyzed, the following candidate topics are identified as having article entries in the network accessible resource: Turing machine 502, NP complete 504, human brain 506, halting problem 508, hay fever 510, finite state machine 512, bicycle 514, Church-Turing thesis 516, IBM 518, NP complexity 520, P vs. NP problem 522, love 524, Cambridge 526, and cow 528. The graph 500 further illustrates a plurality of links 530 between some of the candidate topics. The links 530 are representative of incoming and outgoing links in the corresponding candidate topic entries in the network accessible resource. For example, Turing machine 502 has outgoing links 532, 534, 536 and incoming links 538, 540, 542, 544. Accordingly, the entry in the network accessible resource on Turing machine includes hyperlinks to the halting problem entry, the finite state machine entry and the Church-Turing thesis entry in the network accessible resource (not shown in FIG. 5). Similarly, the entries in the network accessible resource corresponding to the candidate topics NP complexity 520, Church-Turing thesis 516, finite state machine 512, and the halting problem 508 include hyperlinks to the entry corresponding to the Turing machine 502, illustrated in the graph 500 as links 538, 540, 542 and 544, respectively.

On the other hand, a number of the candidate topics in the graph 500 show no connectivity in this example, namely, hay fever 510, bicycle 514, IBM 518, love 524, Cambridge 526, and cow 528. Thus, the mapping or graph 500 of the links between the candidate topics may be generated, as in FIG. 5, to analyze the incoming and outgoing links to each of the candidate topic entries, which thereby provides an indication of connectedness between the candidate topics 502-528.

Figure 6:
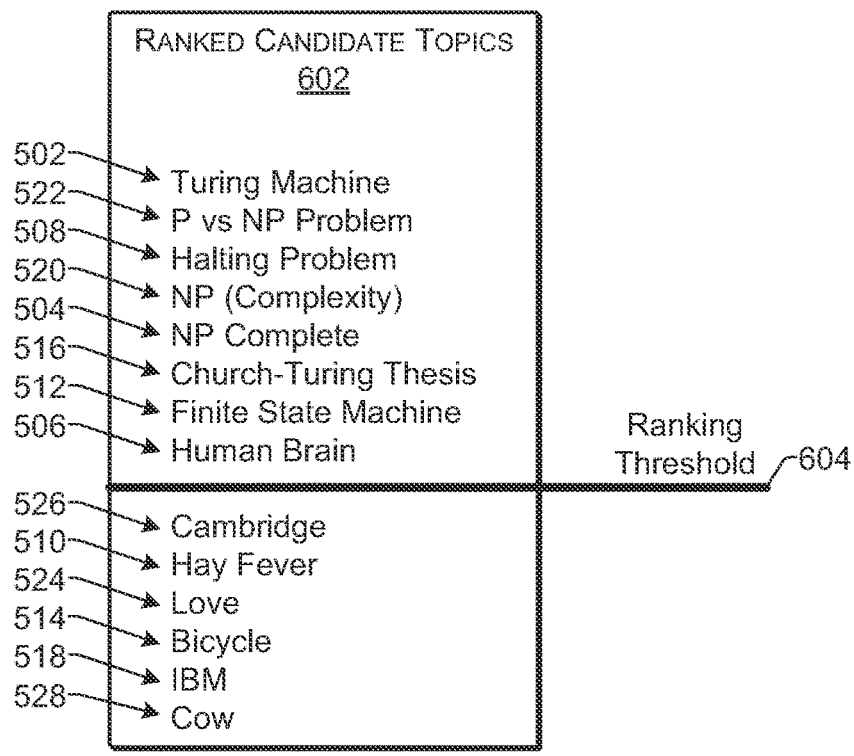
FIG. 6 illustrates an example of applying a ranking threshold to prune candidate topics from ranked candidate topics according to some implementations.

FIG. 6 illustrates an example of applying a ranking threshold to prune or exclude candidate topics according to some implementations. In the example of FIG. 6, the candidate topics from the example of FIG. 5 are ranked based at least in part on analysis of the links 530 between the candidate topics. For example, as mentioned above, the candidate topics may be ranked according to any suitable link analysis algorithm that analyzes the incoming and outgoing links between the candidate topics to obtain a set of ranked candidate topics 602. Furthermore, a ranking threshold 604 may be applied to the ranked candidate topics 602. For example, the ranking threshold 604 may be established based on the type of link analysis algorithm used to rank the candidate topics.

As one non-limiting example, the candidate topics may be assigned a number between 0 and 1 based on the links into and/or out of the corresponding entries in the network accessible resource, and the threshold may be, for example, 0.1, or other suitable threshold, depending on the tolerance for a large number of candidate topics or a smaller number of candidate topics. Accordingly, as illustrated in FIG. 6, candidate topics having a ranking below the ranking threshold 604 are pruned from the set of ranked candidate topics 602, or otherwise removed or excluded from consideration. For example, the ranking threshold 604 may be established based on empirical information or other techniques as discussed above to achieve a desired level of connectedness. The actual value of the ranking threshold 604 may further vary based, at least in part, on the number of topics permitted to be established for a digital work, a length of the digital work, and so forth. In implementations in which each of the candidate topics is assigned a page rank percentage as a ranking value, the ranking threshold value 604 may be based, at least in part, on a threshold percentage that results in pruning any candidate topic having a page rank percentage that is less than the ranking threshold percentage.

In addition, in some examples, the ranking may include or may alternatively be based at least in part on parsing the content of the identified entries. For example, the content of each entry that corresponds to a noun phrase may be parsed to determine whether any other noun phrases corresponding to candidate topics are discussed in the content of each entry. For example, suppose that the entry on Turing machine is parsed and the parsing determines that a number of other candidate topics, such as Church-Turing thesis, finite state machine, halting problem, bicycle, and so forth are mentioned in the entry on Turing machine, while the entry on bicycle does not mention any of the other candidate topics. Consequently, the entry on Turing machine would be ranked higher than the entry on bicycle based on the number of other candidate topics mentioned in the content of the entry.

Other suitable ranking methods may also be apparent to those of skill in the art having the benefit of the disclosure herein.

Figure 7:
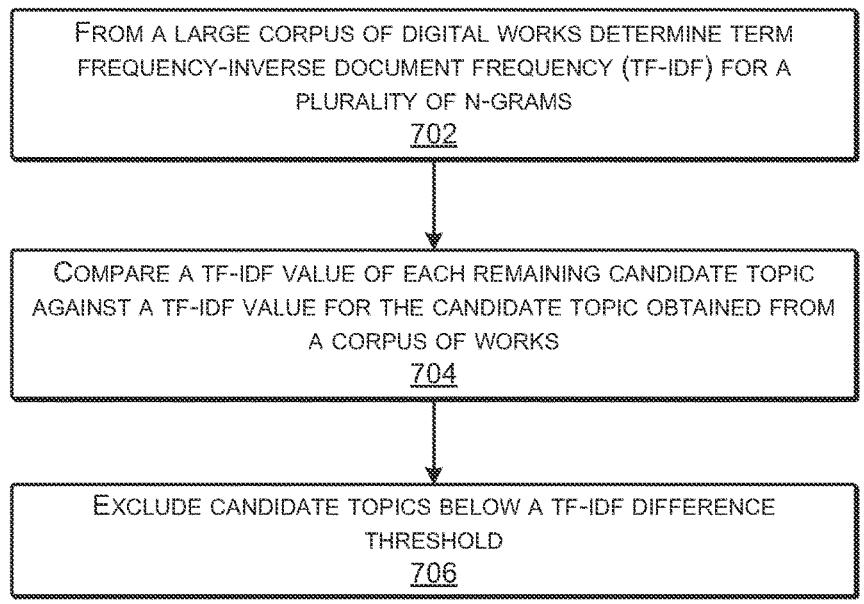
FIG. 7 is a flow diagram illustrating an example process for applying term frequency-inverse document frequency (tf-idf) information for removing candidate topics according to some implementations.

FIG. 7 is a flow diagram illustrating an example process 700 for applying a term frequency consideration to further select candidate topics or refine the selection of candidate topics. As one example, the process 700 may employ term frequency-inverse document frequency (tf-idf) calculations for removing, pruning or otherwise excluding certain candidate topics from consideration according to some implementations. The tf-idf weight or value is a numerical statistic that may indicate how important a word is to a document in a collection or corpus. The tf-idf value may increase proportionally to the number of times a word appears in the document, but is offset by the frequency of the word in the corpus, which helps to control for the fact that some words are generally more common than others.

At 702, from a large corpus of digital works, the process determines term frequency-inverse document frequency (tf-idf) for all terms. For example, a large corpus of digital works or non-digital works may be parsed into a plurality n-grams, such as 1-grams, 2-grams, 3-grams and so forth up to a desired number. The tf-idf for the n-grams in the corpus may then be determined.

At 704, the process then compares the tf-idf of the candidate topics in the digital work with the tf-idf of the corpus. For example, the process may calculate the term frequency of each of the candidate topics in the digital work and compare the tf-idf value of each candidate topic with the tf-idf of the same phrase in the corpus.

At 706, the process removes candidate topics below a tf-idf difference threshold. For example, the process may prune candidate topics from the remaining candidate topics that remain after the pruning discussed above based on the ranking threshold. The tf-idf difference threshold may be established empirically so as to prune candidate topics that are not of particular relevance to the subject of the digital work. Those candidate topics whose tf-idf value is near to the tf-idf value in the corpus within the tf-idf difference threshold may be pruned from the remaining candidate topics 128 to arrive at the topics 138. For example, if the comparison of the tf-idf information shows that a frequency of occurrence of a particular candidate the topic in the digital work is not substantially different from the frequency of occurrence in the corpus as a whole, then that particular candidate topic may be pruned and removed from consideration. Thus, the tf-idf information comparison assists in eliminating topics that are not actually discussed much in the digital work, and therefore are likely to be not strongly related to the main subject of the digital work.

Figure 8:
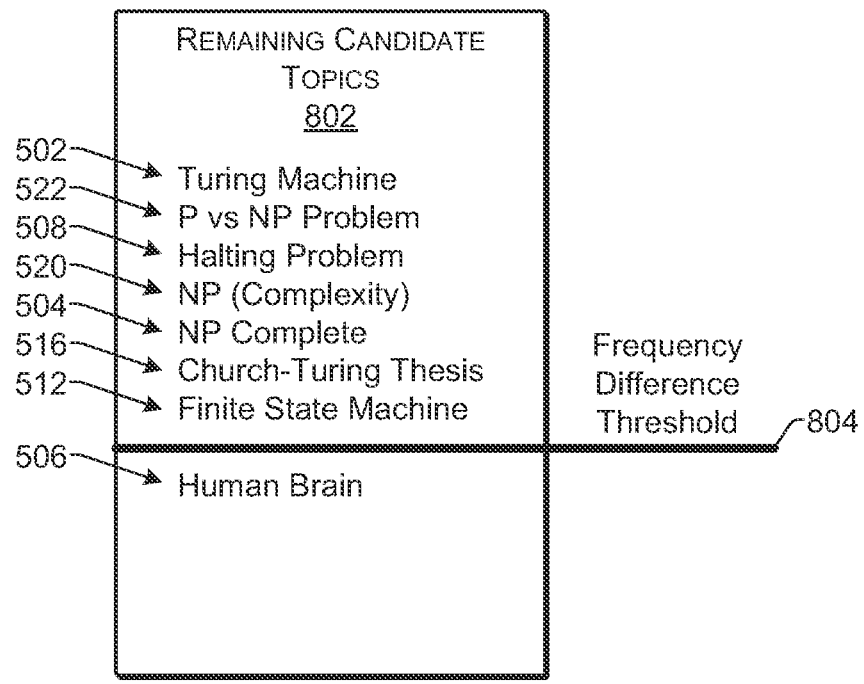
FIG. 8 illustrates an example of removing candidate topics based on a tf-idf difference threshold according to some implementations.

FIG. 8 illustrates an example of removing candidate topics based on tf-idf information comparison according to some implementations. In this example, the set of remaining candidate topics 802 are the candidate topics that remain following the pruning of the ranked topics, as discussed above with respect to the example of FIG. 6. The remaining topics 802 may be further pruned using term frequency information to eliminate candidate topics that do not bear a substantial relevance to the subject of the digital work. For example, a frequency difference threshold 804 may be established based on empirical data to determine a suitable distance or difference between tf-idf values that eliminates topics that are not particularly relevant to the core subject of the digital work. Thus, a term such as "human brain" 506 that occurs frequently in the works in the corpus, may have a tf-idf value in the current digital work that is generally within a normal range of variation from the tf-idf value of the term "human brain" in the corpus. On the other hand, the tf-idf values of the other remaining candidate topics 802 in the digital work may differ substantially from the tf-idf values of these candidate topics in the corpus, e.g., by more than a predetermined percentile or distance.

As one non-limiting example, tf-idf difference values may range from 0 to x, where x is typically <10, and in that range, a suitable frequency different threshold 804 may be 3.0, although various other values may alternatively be employed. Factors to consider when selecting the frequency difference threshold 804 may include desired limits on the number of topics, desired relevance of the topics to the overall subject of the digital work, a length of the digital work (e.g., a longer digital work may have more topics), and the subject matter or category of the digital work (for example, certain types of digital works, such as nonfiction works on technical subjects, may have a larger number of specific topics related to the subject of the work than, for instance, a work of fiction).

In the illustrated example, suppose that the frequency difference for the candidate topic human brain 506 is below the frequency difference threshold of 3.0, while the remaining candidate topics 502, 504, 508, 512, 516, 520 and 522 all have frequency difference values above 3.0. Therefore, based on the frequency difference threshold 804, the candidate topic "human brain" 506 may be pruned or excluded from the set of remaining candidate topics 802 and removed from further consideration. Accordingly, the pruned set of remaining topics 802 may be established as the set of topics for the current digital work. For instance, the topics may be designated as objects in the digital work and may have supplemental information associated therewith that may be accessed by a user to obtain additional information with respect to a selected one of the topics. Further, it may be noted that the ranking threshold 604 and the frequency difference threshold 804 may be related at least in part, such that a higher ranking threshold 604 may allow a lower frequency threshold 804, or a higher frequency threshold 804 may allow a lower ranking threshold 604.

Figure 9:
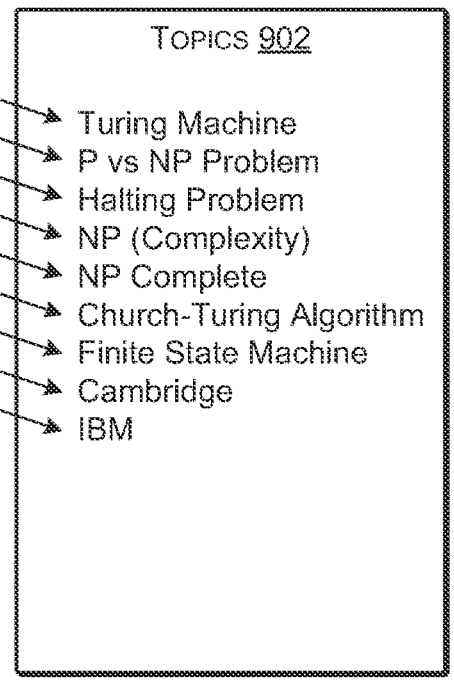
FIG. 9 illustrates an example of rejoining some types of topics according to some implementations.

FIG. 9 illustrates an example of rejoining some types of topics to a set of topics 902 according to some implementations. For example, some types of topics may be considered to be interesting to a user regardless of their connectedness to other topics in the digital work. Thus, topics that are places or organizations may be retained or added back to the set of topics 902 identified in the digital work. The inventors herein have determined that places or organizations are likely to be selected by users for obtaining more or supplemental information. As one example, when applying the ranking threshold or the tf-idf threshold, rather than pruning a topic that is a place or an organization, the place or organization may be retained in the set of candidate topics. Alternatively, the places and organizations pruned from the candidate topics may be rejoined to the topics 902 following completion of the elimination of extraneous topics based on the ranking threshold and/or the tf-idf threshold. Accordingly, in the example of FIG. 9, the candidate topics Cambridge 526 and IBM 518 are added back to the set of topics 902 for the current digital work. Other variations will also be apparent to those of skill in the art in light of the disclosure herein.

Example Architecture

Figure 10:
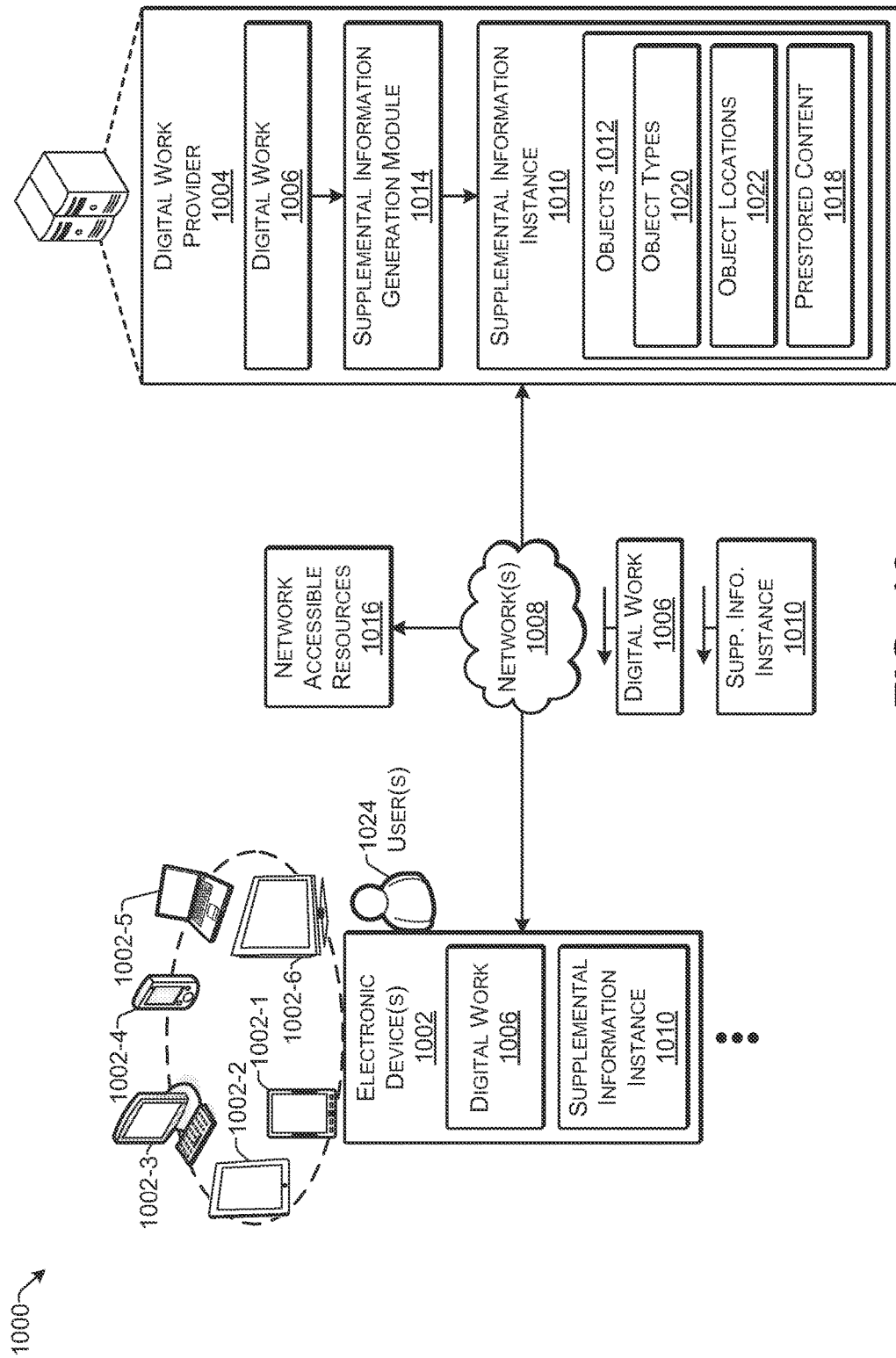
FIG. 10 illustrates an example architecture of a system for generating supplemental information for a digital work and providing the supplemental information to at least one electronic device according to some implementations.

FIG. 10 illustrates an example architecture of a system 1000 for generating supplemental information for a digital work and providing the supplemental information to one or more electronic devices 1002 according to some implementations. Some examples of the electronic device 1002 may include digital media devices and eBook readers 1002-1, tablet computing devices 1002-2, desktop, terminal and workstation computing devices 1002-3, smart phones and mobile devices 1002-4, laptop and netbook computing devices 1002-5, televisions, gaming systems and home electronic devices 1002-6, and any other device capable of accessing and rendering digital works, online content, mobile content, or the like.

The electronic device 1002 may communicate with a computing device of a digital work provider 1004 to access or receive at least one digital work 1006 over one or more networks 1008. In some examples herein, the digital work 1006 may correspond to the digital work 102 discussed above with respect to FIGS. 1-9. The network(s) 1008 may include a local area network (LAN), a wide area network (WAN), such as the Internet, or any combination thereof, and may include both wired and wireless communication technologies using any suitable protocols and communication techniques. The digital work provider 1004 and the electronic device 1002 may communicate and interact with one another using any combination of suitable communication and networking protocols, such as Internet protocol (IP), transmission control protocol (TCP), hypertext transfer protocol (HTTP), and so forth. In some cases, the electronic device 1002 may download the digital work 1006, while in other cases the digital work 1006 may be streamed to the electronic device 1002.

The digital work provider 1004 may maintain an online location, such as a merchant website, an e-commerce site, or other functionality that offers one or more digital works 1006 to the public. Alternatively, the digital work provider 1004 may provide the digital work 1006 to one or more electronic devices 1002 through online or mobile applications executing on the electronic devices 1002 (not shown in FIG. 10).

In some examples, the digital work provider 1004 may generate a supplemental information instance 1010 for a respective digital work 1006 to provide information related to one or more topics, entities, or other objects 1012 in the digital work 1006. The digital work provider 1004 may receive the digital work 1006, such as from the publisher, author, or other source, and may process the digital work 1006 to make the digital work 1006 compatible with various display formats, device platforms, and so forth. The digital work provider 1004 may further execute a supplemental information generation module 1014, which may parse and analyze the digital work 1006 to produce the supplemental information instance 1010 that corresponds to the digital work 1006. For example, as discussed above with respect to FIGS. 1-9, the supplemental information generation module 1014 may analyze the digital work 1006 by identifying topics in the digital work using the frameworks and processes described herein. The supplemental information generation module may further separately identify characters, people, places, organizations, and other objects 1012 in the digital work 1006 that are of significance in the digital work 1006. In some examples, the supplemental information generation module 1014 may access various sources of information, such as network accessible resources 1016 for assistance in identifying objects 1012. Further, the supplemental information generation module 1014 may perform statistical analysis and use statistical modeling to assist in identifying the significant objects 1012 in the particular digital work 1006. Thus, the supplemental information generation module 1014 may identify entities in the digital work that are candidates to be made into objects 1012, such as by identifying topics as described above, as well as proper names, place names, organization names, and the like, in the text of the digital work 1006.

Additionally, to determine which candidate entities to make into objects 1012, the supplemental information generation module 1014 may access other sources of information outside of, or external to, the digital work 1006. For example, the supplemental information generation module 1014 may access the network accessible resources 1016, such as described above with respect to FIGS. 1-9, which may include online sources of information, such as Wikipedia®, Shelfari®, IMDb®, online encyclopedias and dictionaries, discussion forums, social networking sites, community sites, crowd-sourcing sites, or other online resources, which may provide information or clues to assist in performing identification of characters and other significant phrases, organizations, things, events, places, topics, etc., in the digital work 1006. Further, the supplemental information generation module 1014 may obtain additional information or content on the objects identified in the particular digital work 1006, such as by obtaining definitions or other information for these objects from various network locations, such as the authoritative sources mentioned above.

Further, if the digital work 1006 is already in circulation, the supplemental information generation module 1014 may access reader information, such as popular highlights or annotations made by readers of the digital work 1006. For instance, the digital work provider may track which portions of a particular digital work 1006 are commonly highlighted or annotated by readers of the digital work 1006. Additionally, the supplemental information generation module 1014 may access lists of names for identifying proper names, nicknames, slang names, place names, and the like.

Following identification of the objects 1012 in the digital work, the supplemental information generation module 1014 may identify or obtain, from the network accessible resources 1016, where available, excerpts of description, definitions, or other information or content related to identified objects 1012 in the particular digital work 1006. For example, the supplemental information generation module 1014 may obtain content on an object, such as an excerpt from a Wikipedia® article, a Shelfari® or IMDb® listing, page, or the like, to include with the supplemental information instance 1010 as prestored content 1018 for the objects 1012 identified in the particular digital work 1006. In other examples, the supplemental information generation module 1014 determines the network resource location of the content containing information about the object, and merely includes a reference identifier to the network location of the content, rather than providing the content itself, with the with supplemental information.

In addition, for each object 1012, the supplemental information generation module 1014 may identify an object type 1020 and one or more object locations 1022. For example, as described additionally below, each word in a digital work may be assigned a specific location, and the location may be used to identify the location of each occurrence of an object 1012 identified in the digital work 1006. Accordingly, every occurrence of an object 1012 in the digital work 1006 may be quickly located based on the designated object locations 1022.

Further, when the objects 1012 are identified, an object type 1020 may be assigned to an object 1012 based on various gathered information, such as whether a word is a proper noun, usage of the word within the digital work 1006, such as usage in connection with dialogue, presence of prefixes or suffixes, such as Mr., Ms., Junior, etc., and based on any external information obtained from network accessible resources 1016, lists of alternate names, nicknames, name databases, and the like. Accordingly, a large number of clues and indicators may be considered for determining whether a particular object 1012 is a character, place, organization, topic, thing, or so forth.

When a user 1024 of the electronic device 1002 accesses, purchases or otherwise requests or obtains a particular digital work 1006, such as through interaction with the digital work provider 1004, the digital work provider 1004 may make the particular digital work 1006 available for delivery to the electronic device 1002. The digital work provider 1004 may also deliver, or make available for delivery, the corresponding supplemental information instance 1010 for the particular digital work 1006. For example, the particular digital work 1006 and the corresponding supplemental information instance 1010 may be downloaded contemporaneously from the digital work provider 1004, e.g., as a package or as a sequential download. Alternatively, the digital work 1006 and the corresponding supplemental information instance 1010 may be provided to a third party, such as a wireless provider that sends the digital work and the supplemental information instance 1010 to the electronic device 1002. Other variations will also be apparent to those of skill in the art in light of the disclosure herein.

Figure 11:
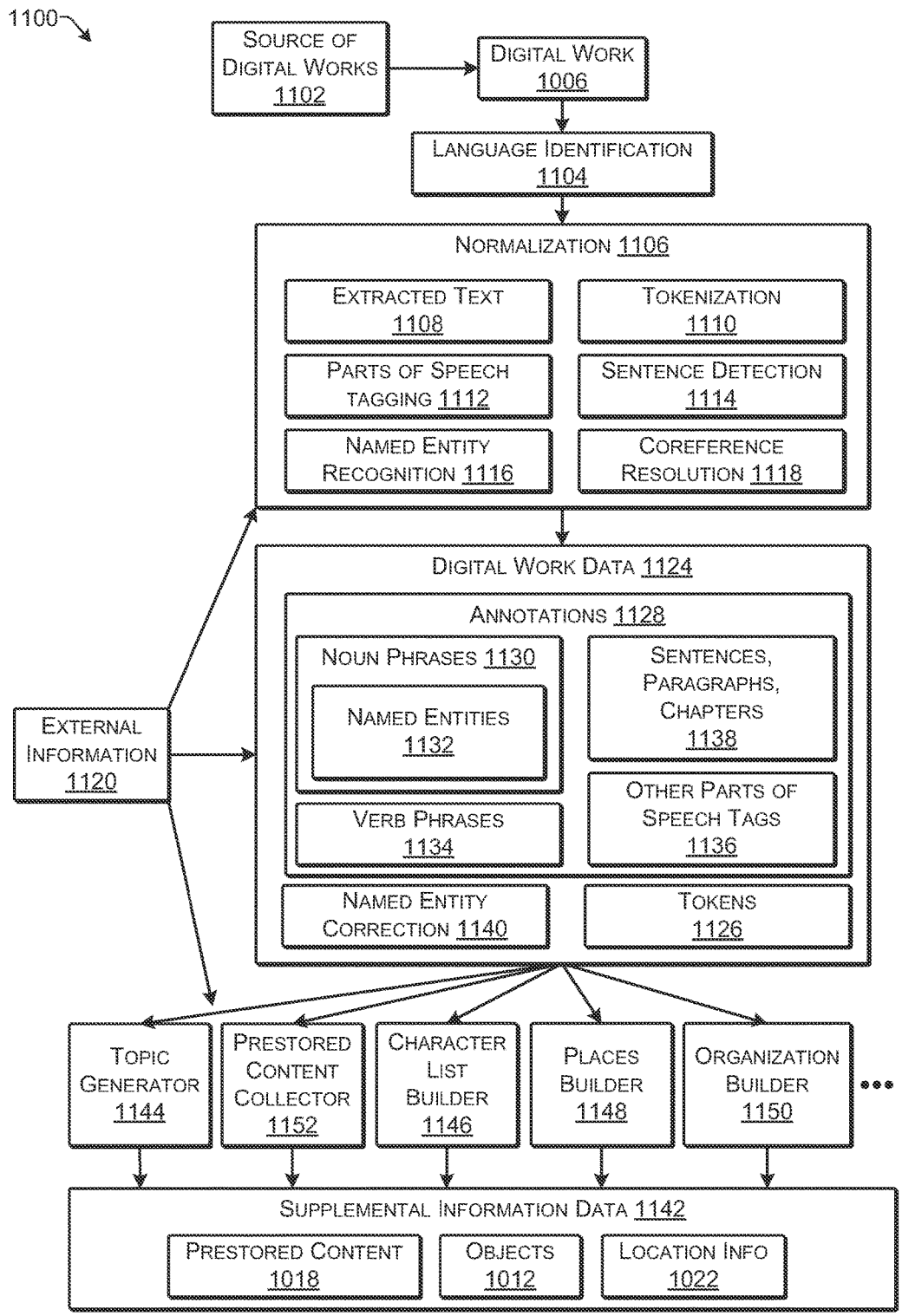
FIG. 11 illustrates an example framework that may be employed for generating supplemental information according to some implementations.

FIG. 11 illustrates an example framework 1100 that may be employed by the supplemental information generation module 1014 of the digital work provider 1004 for generating supplemental information data according to some implementations. In this example, the digital work provider 1004 may receive a digital work 1006 from a source of digital works 1102, such as from a publisher, an author, a digital work library, or other source of digital works. The digital work 1006 may optionally undergo language identification, as indicated at 1104 to identify the language in which the text associated with the digital work 1006 is written. Further, since digital works may be stored in a variety of different formats, the text of the digital work 1006 may be normalized, as indicated at 1106, by extracting the raw text from the digital work 1006 to obtain extracted text 1108. The normalization 1106 may include tokenization 1110 of the extracted text 1108 of the digital work 1006. As discussed additionally below with respect to FIG. 12, tokenization 1110 may include parsing the text of the digital work into tokens that may include individual words, punctuation marks, symbols, etc., contained in the text of the digital work, and associating location information with each token identified in the digital work 1006. Thus, each word or punctuation mark in the text of the digital work 1006 may be assigned a unique location sequence or value, such as based on an offset of the token from the beginning of the digital work and a number of characters in the token, which may be referred to as the length of the token.

Furthermore, normalization 1106 may include, or may be followed by, parts of speech tagging 1112 and sentence detection 1114. Parts of speech tagging 1112 may include identification of parts of speech in the text of the digital work 1006, such as noun phrases, verb phrases, and various other parts of speech that may be of interest for identifying objects 1012 discussed above. Thus, each token may be associated with at least one part of speech. In addition, sentence detection 1114 may include identifying sentences, paragraphs, and chapters contained in the digital work 1006. In some examples, as discussed additionally below with respect to FIG. 12, the parts of speech, the identified sentences, and so forth, may have location information associated therewith that includes a start identifier, a length, and a type. For instance, a length of a sentence or a part of speech may refer to the number of tokens in the sentence or the part of speech, while the start identifier may be identified using the first token in the sentence or part of speech. Furthermore, in some examples, the parts of speech tagging may be performed incrementally one sentence at a time.

Additionally, normalization 1106 may include, or may be followed by, named entity recognition 1116 and coreference resolution 1118. For example, named entity recognition 1116 may include recognizing entities in the digital work, such as names of people, places, organizations, certain numerical expressions, quantities, and so forth. For example, proper nouns, such as names of people, places, organizations, and the like, may be identified based on various lists of names, or other techniques for detecting and distinguishing these separate types of entities. Furthermore, in some cases, external information 1120, that is external to the digital work 1006, may be employed to assist in named entity recognition, such as by referring to the network accessible resources 1016 discussed above with respect to FIG. 10, or other suitable resources such as files or databases of names, nicknames, places, organizations, etc. In addition, coreference resolution 1118 may involve identifying occurrences in the digital work 1006 in which multiple different expressions or pronouns refer to the same thing in the digital work 1006.

The normalization 1106, including the operations described above, results in digital work data 1124 that may include tokens 1126 and annotations 1128. The annotations 1128 may include noun phrases 1130, which may include for example, named entities 1132, such as people/characters, places, organizations, as well as other nouns and noun phrases identified in the digital work 1006 for topics and the like. The annotations 1128 may further include verb phrases 1134 and other parts of speech tags 1136 identified in the digital work 1006. The annotations 1128 may further include information on sentences, paragraphs and chapters 1138 identified in the digital work 1006.

Additionally, in some instances, named entity correction 1140 may be performed for named entities 1132 identified in the digital work data 1124. As one example, an employee of the digital work provider 1004 may check the named entities 1132 in the digital work 1006 for accuracy. As another example, external information 1120 may be applied for checking the named entities 1132 in the digital work data 1124. For example, the named entities 1132 for the digital work 1006 may be posted to a network accessible resource, and crowd-sourced information may be relied on for correcting any errors in the named entities 1132 for the digital work 1006. Thus, the named entities 1132 may be posted to a community website, such as Shelfari®, that includes an entry for the digital work 1006, and visitors to the community website may provide information to correct any errors in the named entities 1132, selected objects 1012, or the like. As another example, users who receive the supplemental information with a digital work may note an error in the supplemental information and may provide the external information 1120 used for named entity correction 1140. Accordingly, crowd-sourced information and crowd-sourced corrections may be used in some cases to perform named entity correction 1140.

The digital work data 1124 may be used to generate supplemental information data 1142, which may include a variety of supplemental information that may be presented to a user to supplement the user's experience when consuming a digital work. For example, a topic generator 1144 may correspond to the topic generator of the framework 100 and the processes described above with reference to FIGS. 1-9. The topic generator 1144 may employ external information 1120 to generate one or more topics from the digital work 1006. For example, the topic generator 1144 may generate a set of useful topics based on a detection of what the digital work is generally related to and by extension where to find more information about the identified topics such as in the current digital work or other digital works. For example, the topic generator 1144 may access Wikipedia® or other network accessible resources 1016 to determine which of the noun phrases 1130 or other terms identified in the digital work 1006 correspond to entries including more information available from the network accessible resources 1016. Further, one or more weighting or ranking factors may be taken into consideration to identify those topics that may be more relevant to the digital work, such as topics that appear multiple times in the digital work, topics that are linked to other topics in the digital work, and so forth.

In addition, a character list builder 1146 may build a list of characters from the named entities 1132 in the digital work 1006 that are identified as corresponding to people or characters. For example, the names corresponding to people in the digital work 1006 may be identified, such as through lists of common names, presence of titles and suffixes, lists of nicknames, and so forth. The person names in the list may be further sorted according to the fullness of name, i.e., whether both first name and last name is provided, whether just a first name or just a surname is provided, etc. The names may subsequently be clustered, and the names in the name sets may further be disambiguated, as described above. For example, characters are often referred to by multiple different names in a digital work. As one example, the expressions "the tin man," the "Tin Woodman," "the Woodman," and "Nick Chopper" are all used to refer the Tin Woodman character in L. Frank Baum's series of Oz books. Accordingly, the character list builder 1146 attempts to associate these various different expressions with a single character. In some instances, external information 1120 may be employed by the character list builder 1146, such as by referring to the network accessible resources discussed above, e.g., with respect to FIG. 10, or other suitable resources, such as files or databases of names, nicknames, places, organizations, etc.

Additionally, each person name that is identified may be mapped to a set of annotations in the digital work. For example, the name "John" might be mapped to 100 annotations because the named "John" occurs 100 times in the digital work. Furthermore, in some cases, a name may occur in two or more name sets because the digital work may contain two or more characters with the same name or alias. For example, a digital work that discusses both "Bill Clinton" and "Bill Cosby" might have the name "Bill" used by itself in the text of the digital work. In such a case, the various techniques described herein may be used to determine which character or person the single "Bill" may refer to, such as by determining a distance from an annotation that includes both "Bill" and a last name.

The character list builder 1146 may use the clustered and disambiguated names to create characters for the digital work including the locations of each occurrence of each character in the digital work. The character list builder 1146 may further determine which name to use as the representative or primary name for a particular character, such as based on a fullness or amount of information in the name.

A places builder 1148, an organization builder 1150, and various other object builders (not shown in FIG. 11) may be included to identify the various objects and the locations of the various objects in the digital work. For example, the places builder 1148 may identify and cluster places that are the same but that are referred to by different names such as by clustering "the English Channel" with "the Channel," in a manner similar to that described above with respect to the character list builder 1146. Similarly, the organization builder 1150 may use similar techniques to identify organizations such as corporations, groups, teams, institutions, associations, clubs, societies, and so forth, discussed in the digital work. Other object builders may be included for various other objects such as things, themes, scenes, events, interesting or popular phrases, popular highlights, citations, relationships between characters, interactions between characters, time periods, and so forth.

In addition, a prestored content collector 1152 may collect and store content related to the objects 1012 identified in the digital work 1006. For example, the prestored content collector 1152 may access the network accessible resources 1016 described above to determine whether any descriptive information is available for each of the objects 1012 identified in the digital work 1006. The prestored content collector 1152 may collect the content available for each object and associate the content with the object. Furthermore, in some cases the content may be of a length that is longer than desirable to be presented to a user electronic device. In such a case, the prestored content collector 1152 may truncate the descriptive material such as by only including the first paragraph of an article or the like.

Additionally, the prestored content is not limited to text content. In some instances, the prestored content may include an audio clip that demonstrates proper pronunciation of an object, such as a character's name or other phrases or words in a digital work. As another example, when the digital work is an eBook, and there is a movie that corresponds to the eBook, one or more video clips or images from the movie may be provided as the prestored content. As one example, some of the video clips may correspond to particular scenes identified as objects in the supplemental information. As another example, some of the video clips may depict particular characters and these video clips may be included in the prestored content in association with names of the corresponding particular characters. Accordingly, a large variety of prestored content may be included with the supplemental information, with the foregoing being just several illustrative examples.

In addition, for each object 1012 identified in the digital work 1006, such as by the character list builder 1146, the places builder 1148, the organization builder 1150, the topic generator 1144, and so forth, the supplemental information generation module 1014 may select an excerpt of text from around the object 1012 to enable the object 1012 to be displayed in context with the excerpt of surrounding text. For example, the supplemental information generation module 1014 may identify a location of each occurrence of each object 1012 and may select a portion of text surrounding the occurrence of the object based on various factors, such as sentence breaks and other punctuation, up to a maximum threshold amount of text permitted before and after the object. The supplemental information generation module 1014 may determine the start location and end location of the excerpt as well as the location of the object occurrence to be highlighted within the excerpt.

Furthermore, while several examples of supplemental information had been described above, numerous other types of supplemental information may be included in the supplemental information data such as images, maps, videos, audio information and the like. As another example, the user may be presented with an option of accessing dictionary definition information for a selected object.

FIG. 12 illustrates an example framework 1200 for determining text tokens and annotations from raw text 1202 according to some implementations. In this example, suppose that the digital work has raw text 1202 that includes a first sentence 1204, "The quick brown fox jumped over the lazy dog," and a second sentence 1206, "The lazy dog sat in the sun." The raw text 1202 may be parsed or divided into token information 1208. For example, each word and punctuation mark in the text 1202 may be identified as a separate token 1210. Alternatively, in other examples, only words are identified as tokens and punctuation marks are treated as parts of adjacent words or as spaces.

Location information may be assigned to or associated with each token 1210 based on the number of characters, such as letters, numbers, spaces, or punctuation marks. The location information may include a sequentially assigned token number 1212, a start location or offset 1214 and an end location 1216. Thus, the word "The" may be the first token in the digital work, and therefore has a token number of "0" as the first token in the digital work. Further, the start location of "The" is also "0," and the end location of "The" is "2" since there are three characters in "The". Next, "quick" is the second token in the digital work and so has a token number of "1." Further, the start location of "quick" is "4" (counting the space between "The" and "quick"), and the end location of "quick" is "8" since there are five characters in "quick." Thus, the entire text of the digital work may be divided into tokens in this manner and each token may be associated with unique location information that identifies the location of the token within the digital work.

Furthermore, annotation information 1218 may be determined from the raw text 1202 and the token information 1208. For annotations, the location is determined based on numbering of tokens, rather than individual characters. For example, annotations 1220 may refer to sentences, paragraphs, chapters, or parts of speech, such as noun phrases, verb phrases, as well as other parts of speech such as determiners, adjectives, nouns, adverbs, pronouns, fonts, emphasis on a work, and so forth. Location information associated with each annotation 1220 may indicate a start location 10222 and a length 1224 of each annotation 1220 in terms of tokens. For example, the first sentence 1204 starts at start location "0" (i.e., the first token), and is "10" tokens in length. Similarly, the second sentence 1206 starts at location "10," and is "8" tokens in length. Thus, the annotation information 1218 may specify particular locations of annotations within the digital work based at least in part on the locations of the tokens that are included in each annotation.

Figure 13:
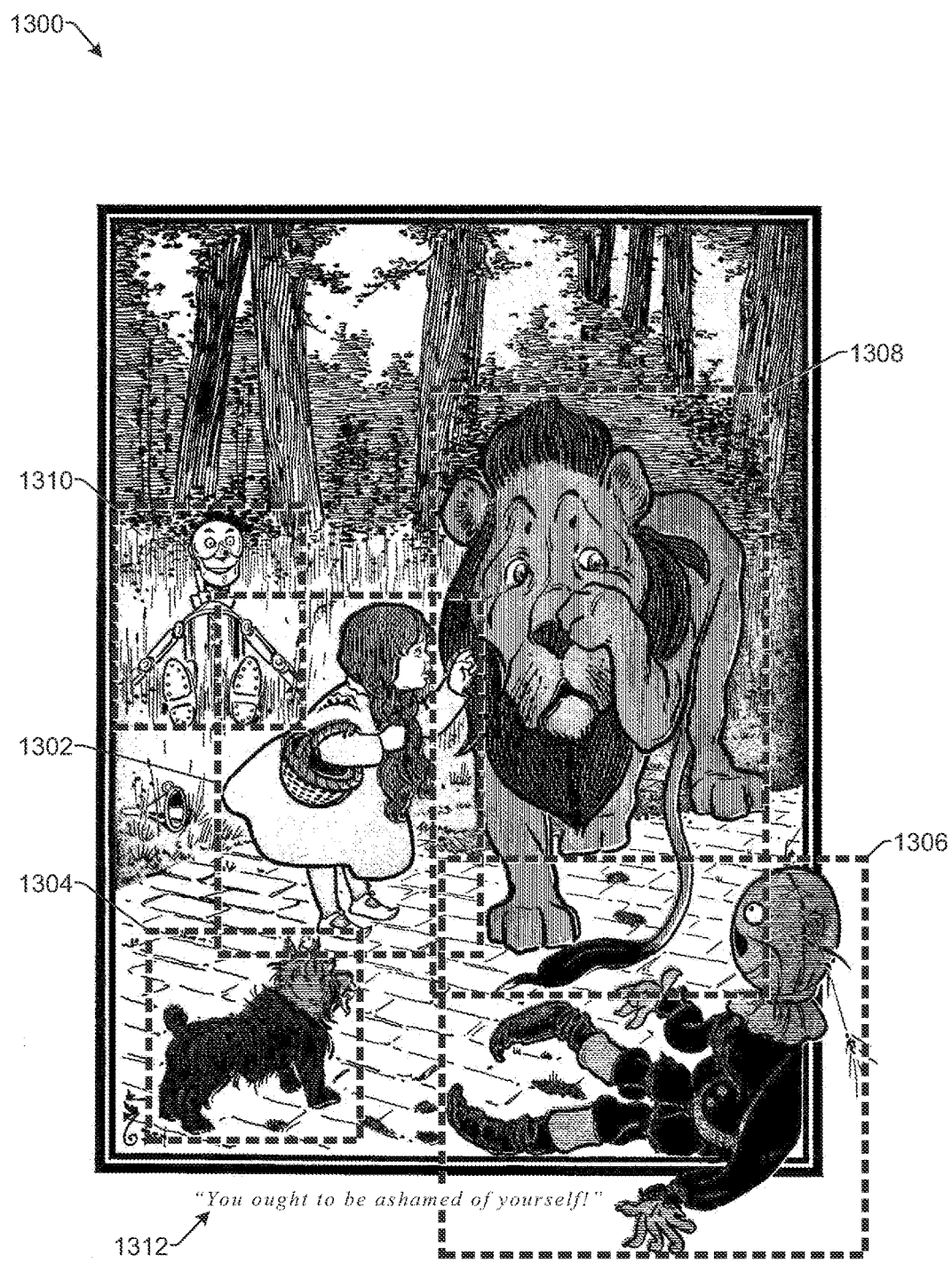
FIG. 13 illustrates an example of determining token locations using coordinates according to some implementations.

Additionally, or alternatively, as illustrated in FIG. 13, the location of a token (and thereby the location of an annotation or object) may be identified or specified using other location identification techniques. For example, the location of each token may be identified according to the coordinates of each token on a page or within an image. For instance, a token may be an image or a portion of an image. Thus, the coordinates of the image or the portion of the image may be identified by a page number on which the image appears and a set of x-y coordinates (i.e., in a plane of the displayed page) or other suitable coordinates.

In the example of FIG. 13, suppose that the digital work is Frank L. Baum's *The Wonderful Wizard of Oz*, and an image 1300 in the digital work includes multiple characters, such as Dorothy, Toto, the Scarecrow, the Cowardly Lion and the Tin Woodman. A first portion 1302 of the image, as indicated by a dashed-lined rectangle, may be identified as including Dorothy, a second portion 1304 of the image may be identified as including Toto, a third portion 1306 of the image may be identified as including the Scarecrow, fourth portion 1308 of the image may be identified as including the Cowardly Lion, and a fifth potion 1310 of the image may be identified as including the Tin Woodman. In some examples, the characters may be recognized and identified in the image 1300 by an employee of the digital work provider or by a member of a community or crowd-sourced information website, such as Shelfari®. In other examples, the characters may be recognized and identified automatically using one or more image recognition algorithms that identify the characters based on comparison with other available images of the characters, stock image collections of dogs, girls, lions, scarecrows, and so forth.

Each of these image portions 1302-1310 may be a token and may have location information associated therewith. For example, the location information may identify a page or location number for the overall image and coordinates of the particular image portion on the page or at the location in the digital work. As one example, a rectangle that bounds a token may be used to identify a location of a token based on x-y coordinates of two diagonally opposed corners of the rectangle, such as coordinates of the upper left corner and the lower right corner of the rectangle. Alternatively, the location of the bounding rectangle may be identified by a coordinate of a single corner and a width and a height of the rectangle. Other shapes, such as a circle, oval, triangle, octagon, and so forth, may be used in place of a rectangle for identifying a token location and/or image portion. Additionally, the rectangles corresponding to the image portions 1302-1310 may not normally be visible, but a user may select a particular image portion to highlight or otherwise select one of the image portions 1302-1310, such as for selecting a selectable object to view supplemental information, as discussed below with respect to FIG. 15.

Further, a combination of text offsets and coordinates may be used for identifying token locations. For example, the image 1300 of FIG. 13 includes the caption 1312: "You ought to be ashamed of yourself!" This text may be tokenized as described above with respect to FIG. 12 based on the words and punctuation marks contained therein. Thus, in some examples, the location of the words and punctuation marks in the caption 1312 may be tokenized using a text-based offset, by simply continuing from the text of the immediately previous page. In other examples, the location of the text and punctuation marks in the caption 1312 may identified using coordinates of the words and punctuation marks. For example, a location of a bounding box for each word or punctuation mark may be identified. Additionally, in some examples, the entire text of a digital work may be tokenized using coordinate locations rather than text offset. Furthermore, various other techniques for generating tokens and identifying the locations of tokens will also be apparent to those of skill in the art in light of the disclosure herein, with the foregoing being merely several non-limiting examples.

Example Structure

Figure 14:
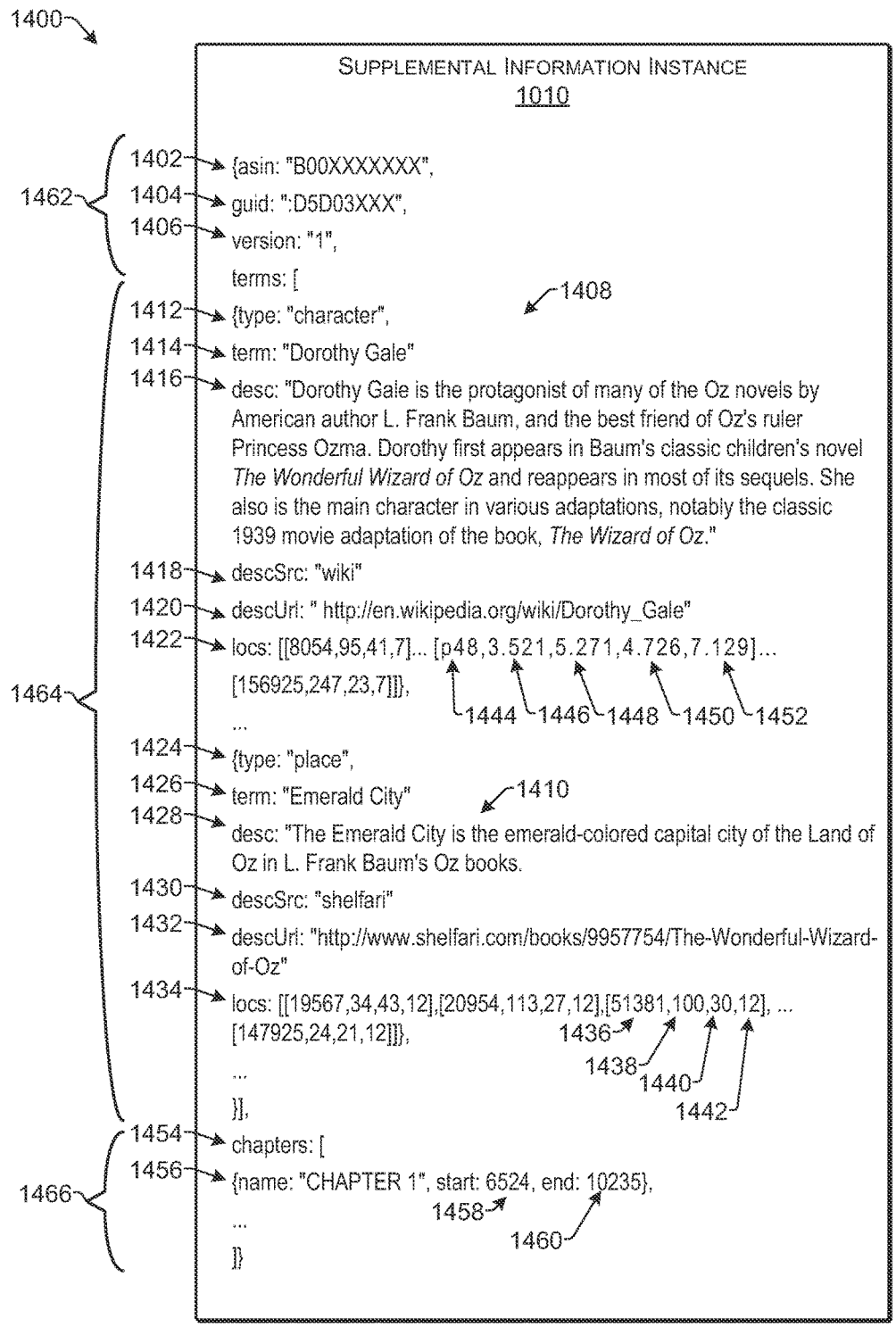
FIG. 14 illustrates an example structure of a supplemental information instance for a digital work according to some implementations.

FIG. 14 illustrates an example structure 1400 of the supplemental information instance 1010 for the digital work 1006 according to some implementations. In this example, the structure 1400 is formatted according to the JSON (JavaScript Object Notation) standard; however, implementations herein are not limited to any particular standard, programming language, protocol, or the like.

The structure 1400 includes an identifier 1402 that identifies the digital work 1006 to which the supplemental information instance 1010 corresponds. For example, the identifier 1402 may be any suitable identifier, such as an ASIN (Amazon Standard Identification Number), a 9-digit or 13-digit ISBN (International Standard Book Number), an ISSN (International Standard Serial Number), an LCCN (Library of Congress Control Number), or any other suitable identifier that can be used to correlate the supplemental information with the correct corresponding digital work. For example, in some cases, the identifier 1402 may merely be the title of the digital work, an arbitrarily assigned number, or the like. The structure 1400 may further include other header information such as a GUID 1404, which may be a globally unique identifier for the file content of the digital work; and a version 1406, which may indicate a format version of the structure 1400.

The structure 1400 may further include object information for one or more terms or objects in the digital work 1006. In the illustrated example, first object information 1408 is included for the character "Dorothy Gale," and second object information 1410 is included for the place "Emerald City," although object information for numerous other objects, including topics, places and organizations, may be similarly included in the structure 1400. The object information 1408 includes an object type 1412, which in this example is a "character," an object term 1414, "Dorothy Gale," which is the representative name for the object, and an object description 1416. The object description 1416 may be an excerpt or description obtained from one or more network accessible resources 1016, as described above. In this example, the description is an excerpt obtained from a Wikipedia® article on the character Dorothy from *The Wonderful Wizard of Oz*. Accordingly, a description source 1418 may indicate that the source of the description is Wikipedia®, and a description URL 1420 may indicate the URL from which the prestored content description 1416 was drawn. For instance, a user having network connectivity may access the description URL 1420 for performing further reading on the particular object. Additionally, in some examples, the description URL 1420 may be provided instead of the prestored content in the description 1416. Further, location information for one or more locations 1422 of occurrences of the object are included to identify the locations of one or more respective occurrences of the object in the digital work.

Similarly, the object information 1410 includes an object type 1424, which in this example is a "place," an object term 1426, "Emerald City," which is the primary name for the object, and an object description 1428. In this example, the description is an excerpt that may have been obtained from a Shelfari® listing on the Emerald City under the entry for *The Wonderful Wizard of Oz*. Thus, a description source 1430 may indicate that the source of the description is Shelfari®, and a description URL 1420 may indicate the URL from which the descriptive content was drawn. One or more locations 1434 are included to identify the location of one or more respective occurrences of the object in the digital work. Further, while two types of objects have been illustrated in this example for discussion purposes, numerous other objects and other types of objects, as enumerated above, may be included in the structure 1400 and similarly formatted.

The locations 1422, 1434 provided for the objects may include four or more values that represent an excerpt of text from the digital work and one or more object occurrences to highlight in the excerpt. For example, suppose an excerpt of text goes from location 51381 to location 51481 and contains a highlighted object occurrence at 51411 to 51423. This may be expressed using four discrete numbers or values to represent both the excerpt and the highlighted term within the excerpt. The first value 1436 in the location information represents the starting location of the excerpt in the digital work as an offset from the beginning of the digital work, as discussed above with respect to the tokens of FIG. 12. Thus, in this example, the starting location is "51381" as indicated at 1436. In addition, the length of the excerpt is "100" positions (e.g., each position may correspond to one character, space or punctuation mark), with the object to be highlighted starting 30 positions into the excerpt. Accordingly, the second value 1438 in the location information, which is "100" in this example, indicates the length of the excerpt (or the number of positions in the excerpt). The third value 1440 indicates the starting location (30) of the object occurrence in the excerpt, and the fourth value 1442 indicates the length (12 positions or characters) of the object in the excerpt. Thus, the location numbering enables extraction of an excerpt of text from the digital work and highlighting of the object in context in the excerpt. Further, when more than two objects are contained in a single excerpt, then six numbers may be used to represent the locations of the two objects within the single excerpt, with the last two values representing the start location and length of the second object to be highlighted in the excerpt.

In addition, it may be noted that the locations associated with each object in the structure 1400 provide an index for locating other occurrences of a selected object. Thus, by grouping the locations of the occurrences of an object with one another in the manner described in FIG. 14, name merging of alternate names may be automatically provided for so that listing of separate alternate names in the structure 1400 is not necessary. For example, suppose that a digital work contains separate occurrences of the names "Dorothy," "Dorothy Gale," and "Miss Gale." These alternate names may be clustered and disambiguated by the character list builder, as described above, to all relate to the single character "Dorothy Gale." Accordingly, the locations of the different occurrences of "Dorothy" and "Miss Gale" may be included in the locations 1422 for "Dorothy Gale." Consequently, if a user selects an occurrence of the object "Dorothy" in the text of the digital work, the location of the selected object is used to identify the object information 1408 for the selected object, and thereby to identify all other occurrences of the object, regardless of whether the occurrences are "Dorothy," "Miss Gale," or "Dorothy Gale." Consequently, merging of alternate names is automatically achieved through the use of locations to identify selected objects, thereby negating the need to have separate object information listings for "Dorothy," "Miss Gale," and "Dorothy Gale.

In addition, in some examples, the location information 1422, 1434 may include location information related to other digital works as well. For example, suppose that the supplemental information instance 1010 corresponds to *The Wonderful Wizard of Oz*. Furthermore, suppose that the Dorothy Gale character appears in a number of other Oz books. Location information may be included for those other Oz books as well, as discussed additionally below, to enable displaying of supplemental information for an object across a series or other plurality of digital works. As one example, the location information for locations outside a particular digital work may include a fifth value that may be the digital work identifier 1402 described above for the other digital work.

In addition, as discussed above with respect to FIG. 13, in some cases, the location information for some or all of the objects may be based on a coordinate system, rather than, or in addition to, a text offset. In the illustrated example of FIG. 14, the location information 1422 for Dorothy Gale includes both text offset location information (i.e., "[8054,95,41,7]," and "[156925,247,23,7]"), as well as coordinate system location information ("[p48,3.521,5.271.4.726,7.129]"). The coordinate system location information in this example includes a page number 1444, a first x-axis coordinate 1446, a first y-axis coordinate 1448, a second x-axis coordinate 1450, and a second y-axis coordinate 1452. Thus, the first x and y coordinates 1446, 1448 may identify a location of a first corner of a bounding box and the second x and y coordinates 1450, 1452 may represent a location of a second corner of a bounding box that encompasses a particular token. For example, the coordinate system location information in this example may describe the position of a rectangle that includes an image of Dorothy, as discussed above with respect to FIG. 13. As an alternative, the second two values 1450, 1452 may be a width and height of a bounding box having a corner located at the first two coordinates 1446, 1448. Still alternatively, in the case that a bounding circle is used, rather than a bounding box, the first two coordinates may be a location of a center of the circle and only one additional value may be used to specify a radius of the bounding circle. Numerous other variations will be apparent to those of skill in the art having the benefit of the disclosure herein.

In the structure 1400 of FIG. 14, following the conclusion of the term or object information, the structure 1400 may include chapter information for chapters 1454 of the digital work. Thus, each chapter 1454 may be identified by the name 1456 of the chapter, i.e., "CHAPTER 1" in this example, the start location 1458 of the chapter and the end location 1460 of the chapter. Accordingly, in the illustrated example, the structure 1400 includes three sections, namely a header section 1462, a terms or object information section 1464, and a chapters section 1466. Further, other types of supplemental information may be included in the structure 1400 in addition to examples described above. Accordingly, implementations herein are not limited to the particular example structure illustrated, and numerous other structures and formats will be apparent to those of skill in the art having the benefit of the disclosure herein.

Example Interface

Figure 15:
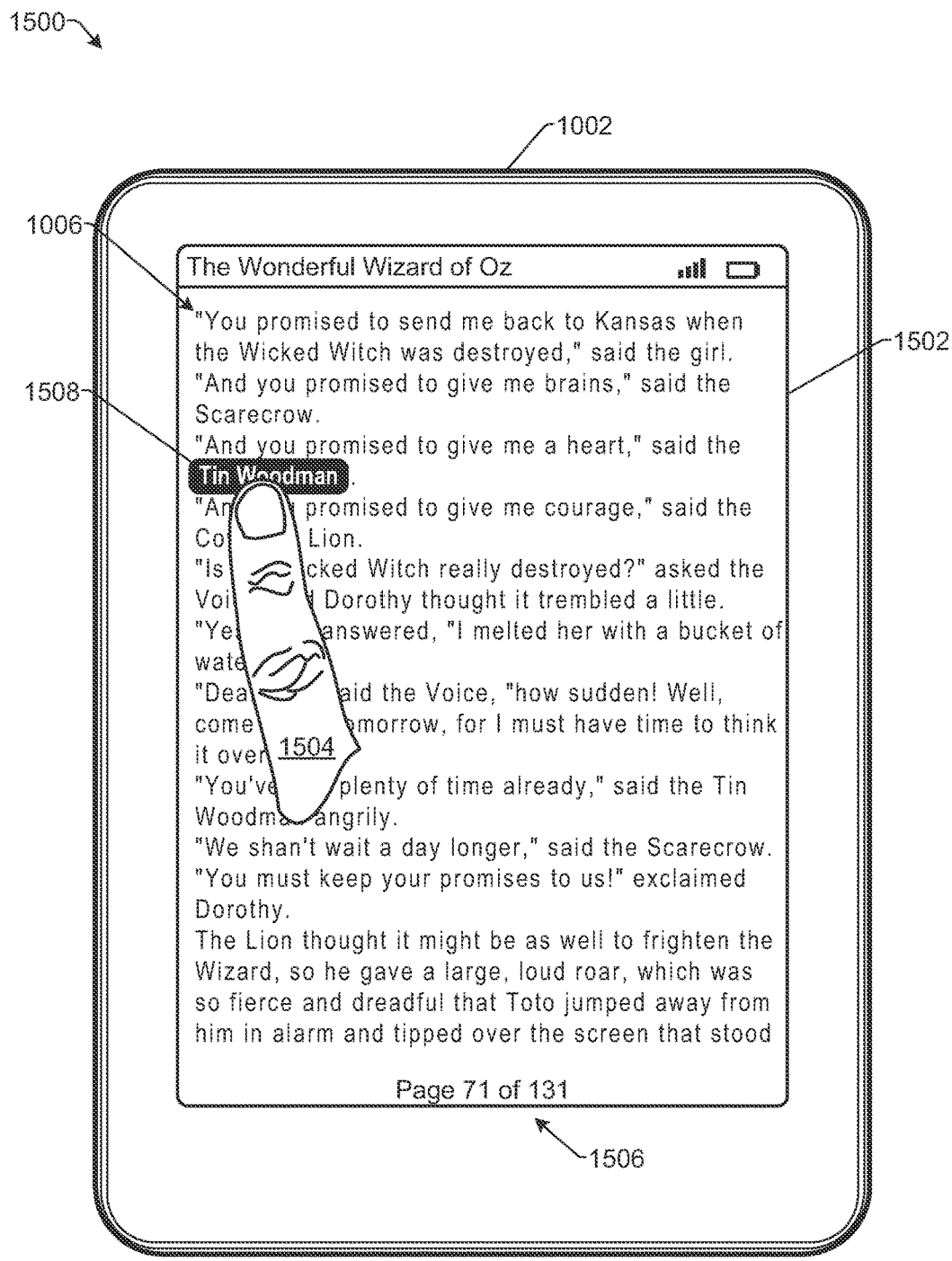
FIG. 15 illustrates an example device having an interface providing access to supplemental information according to some implementations.

FIG. 15 illustrates an example interface 1500 on the electronic device 1002 that enables selection of an object in a digital work 1006 according to some implementations. The device 1002 includes a display 1502 for displaying the digital work 1006 to a user. In some examples, the display 1502 may be a touchscreen type of display configured with a sensor to sense a touch input received from an input effecter 1504, such as a finger of a user, a stylus, or other pointer. Thus, the touchscreen may receive one or more touch inputs, interactions, selections of displayed objects, page swipes and so forth. In other examples, the display 1502 may be non-touch sensitive. Accordingly, in addition to, or as an alternative to, a touch sensitive display, the electronic device 1002 may include various external controls and input devices (not shown in FIG. 15). For example, some implementations of the electronic device 1002 may include a virtual or physical keyboard, a mouse, a pointing stick, a touchpad, a trackball, a joystick, a remote control, buttons and/or various other controls for performing various desired inputs and interactions with the electronic device 1002 and digital work 1006 displayed on the display 1502. Additionally, in some implementations, one or more voice commands may be used to control or interact with the digital works and interfaces herein, such as for selection of objects and performing other functions. Thus, implementations herein are not limited to any type of input devices, techniques, or controls.

In the illustrated example of FIG. 15, suppose that the digital work 1006 that the user is reading is *The Wonderful Wizard of Oz* by L. Frank Baum, and that page 71 of the digital work is currently displayed on the display 1502 of the electronic device 1002, as indicated by the displayed page number 1506. Furthermore, suppose that the user desires to obtain more information regarding the Tin Woodman character of the digital work 1006. As illustrated in FIG. 15, the user may select an instance of the name of the Tin Woodman currently displayed on the electronic device 1002 as an object 1508. Other types of objects, such as topics, places, organizations, things, and so forth may be similarly selected from the text.

In the case that the display 1502 includes a touch screen, the user may use the input effecter 1504 (e.g., a finger) to select the name of the Tin Woodman. In other examples, the user may use other input controls, as described above, to select the object 1508, depending on the particular type and configuration of the electronic device 1002. For example, the user may employ a mouse, a pointing stick, a touchpad, a trackball, a joystick, a remote control, buttons and/or various other controls for selecting objects displayed in the digital work 1006 on the display 1502. Further, the objects that may be selected are not limited to words or phrases, but may include symbols, icons, images, figures, selectable areas of an image or video, and so forth. For example, in the case that the digital work 1006 is an image or video, examples of objects may include an image of a person or thing included in the image or video. Similarly, textual digital works may include symbols, maps, tables, images, and the like, that may also be objects that are selectable for viewing supplemental information according to some implementations herein.

Figure 16:
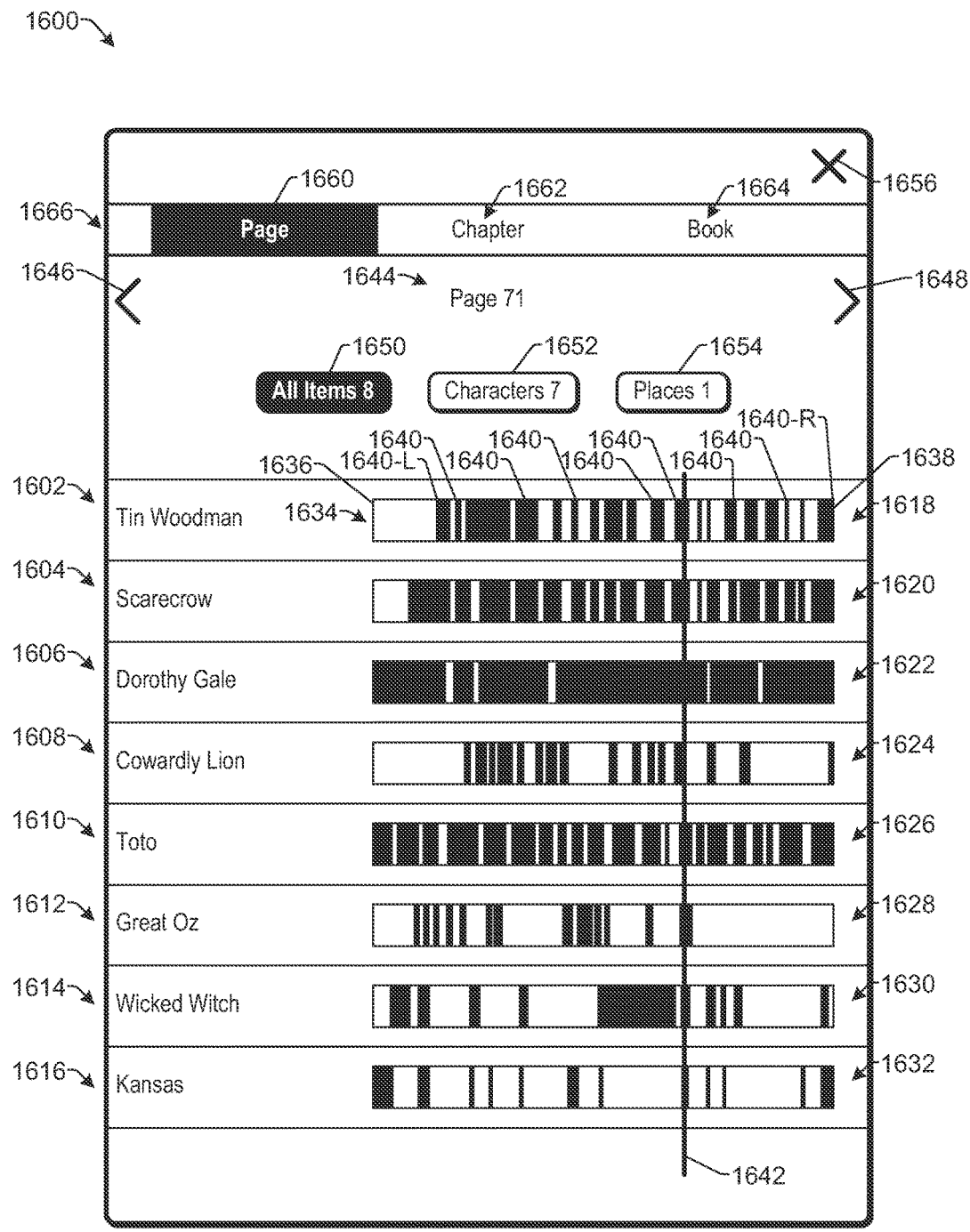
FIG. 16 illustrates an example interface providing supplemental information, depicting a page view user interface according to some implementations.

FIG. 16 illustrates an example of supplemental information displayed in a page view user interface 1600 according to some implementations herein. In this example, in response to user input received from the user in association with selection of the object 1508, the electronic device 1002 may display the user interface 1600 as a pop-up or overlay displayed overtop of the digital work 1006. In other implementations, the user interface 1600 may be displayed as a separate window or screen encompassing all or a portion of the display 1502. In yet other examples, the interface 1600 may be displayed in a split screen arrangement in which the user interface 1600 is displayed in a first portion of the display 1502 and the digital work continues to be displayed in a second portion of the display 1502, such as in a reduced size. Numerous other variations will also be apparent to those of skill in the art in view of the disclosure herein.

In this example, the user interface 1600 presents a plurality of objects identified on the particular page of the digital work 1006 at which the user selected the object 1508, as described above. For example, page 71 of the digital work 1006 identifies eight objects in total, including seven characters and one place. Accordingly, as mentioned above, the objects, such as characters, places, things, phrases of interest, events, popular highlights, and so forth, may be identified in a digital work in advance by the digital work provider. The digital work provider may then provide the supplemental information instance 1010, which includes the location and occurrence of each object identified in the digital work 1006, to the electronic device 1002 along with the digital work 1006.

In the illustrated example, the page view user interface 1600 displays the objects identified in page 71 of the digital work 1006. Accordingly, in this example, the user interface 1600 displays a listing 1602 for the Tin Woodman, a listing 1604 for the Scarecrow, a listing 1606 for Dorothy Gale, a listing 1608 for the Cowardly Lion, a listing 1610 for Toto, a listing 1612 for the Great Oz, a listing 1614 for the Wicked Witch, and a listing 1616 for Kansas. Associated with each item listing 1602-1616 is a visual representation that provides an indication of a location and frequency of each object in the digital work 1006. Thus, the interface 1600 provides a visual representation 1618, for the Tin Woodman, a visual representation 1620 for the Scarecrow, a visual representation 1622 for Dorothy, a visual representation 1624 for the Cowardly Lion, a visual representation 1626 for Toto, a visual representation 1628 for the Great Oz, a visual representation 1630 for the Wicked Witch, and a visual representation 1632 for Kansas.

In some examples, the objects displayed in the page view user interface 1600 may be displayed in an order in which the objects appear on the particular page from which the page view user interface 1600 is drawn. As another example, the listed objects in the page view user interface 1600 (and the other user interfaces described herein) may be displayed in an order of frequency of occurrence of each object in the digital work. For instance, the object occurring most frequently in the digital work may be listed first, and the other objects may be listed in a descending order of frequency. Further, when there are more objects listed than will fit on the view in the user interface, the listing may automatically scroll to display the selected object within the listing. As another example, the selected object may be listed first and the remaining objects may be displayed in the order of appearance on the page or an order of frequency. As some additional examples, the listed objects may be displayed in alphabetical order or according to a category or type of object. Numerous other variations will be apparent to those of skill in the art in light of the disclosure herein, with the foregoing merely being several examples. Further, the page view user interface 1600 and the other user interfaces described herein may include a control or button (not shown) for switching between various ordering arrangements for the objects. For example, the control may enable switching between ordering based on frequency, to ordering based on order of occurrence in the page or digital work, order based on type, or alphabetical ordering. As another example, the control may enable switching between displaying the most the frequently occurring objects listed first to displaying the least frequently occurring objects listed first, and so forth.

The visual representations 1618-1632 may represent both the location and frequency of occurrence of each corresponding object in the digital work 1006. For example, with respect to the visual representation 1618 for the Tin Woodman, the visual representation 1618 includes an area 1634 extending between a first side 1636 that is representative of a beginning of the digital work 1006 and a second side 1638 that is representative of an end of the digital work 1006. In this example, the area 1634 has a rectangular outline; however, other shapes and types of representations may also be used as discussed below. For example, in some implementations, the area 1634 may not have an outline or shape. The area 1634 extends from the first side 1636 to the second side 1638 and may be representative of the expanse (e.g., a total number of pages, a total runtime, a total number of locations, etc.) of the digital work that the visual representation 1618 symbolizes.

At least one vertical line, bar or other type of marking 1640 may be located in the area 1634. The marking 1640 may correspond to at least one referenced of the object in the digital work. Further, in some implementations, the location of the marking 1640 may generally correspond to a location of the occurrence of the object in the digital work itself. In the illustrated example, with respect to the visual representation 1618 for the object Tin Woodman, a plurality of markings 1640 are located within the area 1634 corresponding to a plurality of occurrences of the object Tin Woodman, or variations thereof, in the text of the digital work 1006. For example, a leftmost first marking 1640-L, closest to the first side 1636, represents the first occurrence of the object Tin Woodman in the digital work 1006. A rightmost second marking 1640-R, closest to the second side 1638, represents the location of the final occurrence of the object Tin Woodman in the digital work 1006.

The other markings 1640 located between the first marking 1640-L and the second marking 1640-R may represent other occurrences of the object Tin Woodman in the digital work 1006 at various locations corresponding to the locations of occurrences of the object Tin Woodman in the digital work. For example, for each page in the digital work on which the object Tin Woodman's name, or a variation thereof, appears, a marking 1640 may be applied to the visual representation 1618. Accordingly, in some implementations, if the resolution of the display 1502 permits, the visual representation 1618 may be generally to scale with a number of pages in the digital work 1006, with each marking 1640 representing at least one page in the digital work 1006 and being in a location corresponding to or proportional to the location of the page in the digital work out of a total number of the pages in the digital work. Thus, in some examples, occurrences of the object Tin Woodman on adjacent pages may appear as a single larger continuous marking 1640. Further, in some examples, a marking 1640 between the first side 1636 and the second side 1638 may be at a location that is proportional to a location of a page corresponding to the occurrence between the first page and the last page of the digital work.

Additionally, in some examples, such as in the case of a digital work that is a movie, song or television show, the digital work may have a total runtime, and the location of the marking in the visual representation may be proportional to an elapsed runtime of the occurrence out of a total runtime of the digital work. Further, in some examples, the digital work may have length analogous to a total text content, and the marking in the visual representation may correspond to a location of the occurrence of the object in the text content in relation to the total text content. In other examples, as described below, depending on the resolution of the display 1502, other types of markings may be used that may provide additional details, such as the number of occurrences of the object on each page of the digital work. Accordingly, numerous variations will be apparent to those of skill in the art in light of the disclosure herein.

Furthermore, in the example of FIG. 16, the page view user interface 1600 is rendered based on page numbers of the digital work 1006. In other implementations, however, rather than using page numbers, the page view user interface 1600 may be rendered based on location numbers determined for the digital work 1006. For instance, in some devices or platforms, a digital work is not displayed with page numbers or may not have page numbers associated therewith. As one example, because various different display conditions may exist during the rendering of a digital work on various different devices having various different display sizes and resolutions, page numbering may not apply to a digital work on some devices or platforms. In such a case, the digital work provider may use invariant referencing to assign location numbers to parts of the digital work. The location numbers may remain constant for the parts of the digital work regardless of a screen size, font type, font size or other variations in the display conditions of the digital work. Additional information on assigning location numbers to parts of a digital work is provided in U.S. Pat. No. 7,865,817 to Ryan et al., the entire disclosure of which is incorporated herein by reference. Still alternatively, the location numbering for the tokens described above with respect to FIGS. 12-13 may be employed as displayed location numbers.

Accordingly, in these implementations, rather than using page numbers, the digital work 1006 of FIGS. 10 and 15 may be displayed as one or more location numbers, such as a range of location numbers out of a total number of locations in the digital work 1006. Consequently, the interface 1600 may be generated based on the range of locations rendered on the display 1502 when the selection of the object 1508 is made. For example, suppose that the text of the digital work 1006 displayed in FIG. 15 corresponds to locations 1144-1155 out of a total 347 locations. Therefore, the listings 1602-1616 displayed in the user interface 1600 would correspond to the occurrence of the objects contained in locations 1144-1155 currently rendered on the display 1502.

Additionally, in the examples of digital works in which assigned locations are used instead of page numbers, the area 1634 of the visual representation 1618 may represent an expanse of the total locations in the digital work, from the first location on the first side 1636 to the last location on the second side 1638. Thus, the location of a marking 1640 in the visual representation may correspond to a location of the occurrence in the digital work and may be at a location between the first side 1636 and the second side 1638 that is proportional to a location of the occurrence in the digital work. For purposes of this description, regardless of whether page number or location identifiers are used, for ease of explanation a "page" will refer to the visible text that is displayed on the device and is not dependent upon a physical page size or font.

Referring again to FIG. 16, a vertical line 1642 may be displayed in the user interface 1600, traversing or passing through the visual representations 1618-1632, to indicate the location of the currently rendered page 71 (or equivalent location number range) with respect to the overall digital work 1006. Further, the current page number corresponding to the location of the vertical line 1642 and the displayed listings 1602-1616 is indicated at 1644. For example, the user may navigate the user interface 1600 to other pages in the digital work, such as by selecting a left arrow 1646 or a right arrow 1648 to move backwards or forwards in the digital work 1006, respectively. As one example, the user may tap the left arrow 1646 one time to move the user interface 1600 from the representation of objects on page 71 to a representation of objects on page 70 of the digital work 1006.

As the user navigates from one page to another, listings of various object may disappear or appear in the user interface 1600. For example, the object Kansas may not be mentioned on page 70 of the digital work 1006. Consequently, when the user navigates the user interface 1600 from a page view for page 71 to a page view for page 70, the listing 1616 and visual representation 1632 for the object Kansas may disappear while a listing and visual representation for one or more other objects referenced on page 70 may be added to the user interface 1600. In some instances, rather than just disappearing or being suddenly replaced, a fade effect may be applied such that the objects may fade in and out to enable the user to track which object are not present on particular pages. Additionally, in some examples, rather than tapping the left arrow 1646 or the right arrow 1648 to navigate to a page view for a different page, the user may select or otherwise drag the vertical line 1642 left or right to a different location with respect to the visual representations. The user can then view the user interface representation with respect to a different page, and the current page is identified by the page number indicator 1644.

In the illustrated example, the total number of different objects referenced on page 71 is indicated in an "all items" button 1650, which in this example indicates that there are a total of eight objects, which correspond to the eight listings 1602-1616. Further the number of character objects on page 71 is indicated in a characters button 1652 (i.e., seven in this example), while the number of place objects contained on page 71 is indicated in a places button 1654 (i.e., one in this example). In this example, the all items button 1650 is currently selected and, thus, all eight of the objects referenced on page 71 are displayed in the user interface 1600. On the other hand, if the user wanted to view just the character objects referenced on page 71, the user could select the characters button 1652 to display a listing of just the character objects in the user interface 1600 (i.e., listings 1602-1614). Similarly, if the user wanted to view just the place objects referenced on page 71, the user may select the places button 1654 and only the listing 1616 corresponding to the place objects (in this example Kansas) would be shown in the user interface 1600. Further, numerous other types of object buttons (e.g., phrases, things, organizations, etc.) may be displayed when those types of object are available on the particular page for which the supplemental information is being presented. However, when those types of object are not available on the page corresponding to the current page view interface 1600, then the object buttons for those object types may also not be displayed.

The techniques described above may be employed to navigate the page view interface 1600 to the presentation of a page view interface 1600 corresponding to a different page. When the user navigates the user interface 1600 to a different page, the corresponding different page from the digital work may be rendered on the display 1502 underneath the user interface 1600. Accordingly, the page of the digital work displayed on the display 1502 may change in correlation with the movement of the vertical line 1642 to various different pages in the digital work 1006. For example, suppose that the user wishes to move to the first occurrence at which the object Tin Woodman appears in the digital work 1006 to reread that portion of the digital work (e.g., page 37). The user may move the vertical line 1642 to the beginning of the leftmost marking 1640-L. Based on this movement of the vertical line 1642, the device may then change the page rendered on the display 1502 to correspond to the page at which the vertical line 1642 is currently located, i.e., page 37. The user may then close the user interface 1600, such as by tapping on a close-window control 1656 (e.g., an X in the upper right corner of the interface 1600). This action will close the user interface 1600 and present the user with the text of page 37 at which the object Tin Woodman is first mentioned in the digital work 1006. Accordingly, the user may employ the user interface 1600 to navigate through the digital work 1006 to locations of various objects of interest.

As mentioned above, the page view user interface 1600 displays a page view which displays the objects referenced on the currently rendered page. Accordingly, the user interface 1600 may indicate that the current view is the page view. Several examples of indicators include highlighting a word "page" 1660, outlining the word "page" 1660, bolding the word "page" 1660, enlarging the word "page" 1660, placing a marker or pointer under or above the word "page" 1660, or other suitable indicator may be provided to indicate that the current view is the page view. The user interface 1600 may also indicate that a chapter view and a book view are available for selection based on presentation of the word "chapter" 1662 and the word "book" 1664, as indicated in a header 1666 of the user interface 1600. For example, if the user desires to view the chapter view or the book view, the user may select the corresponding word "chapter" 1662 or "book" 1664 to switch to a chapter view user interface or book view user interface, respectively. Further, some digital works may not have "chapters." Consequently, for these digital works, the word "chapter" 1662 may not be present in the page view user interface 1600, but the option to navigate to the book view may remain.

Further in the case that the digital work is part of a series, a series view interface (not shown in FIG. 16) may be provided to navigate a series view interface. Location information for occurrences of objects in other digital works in the series may be included in the structure 1400 described above. Similarly, in some implementations, a library view interface (not shown in FIG. 16) may be available that shows all the occurrences of an object across an entire library of digital works. In some examples, the library of digital works used to generate the library view interface may be limited to the digital works contained on the electronic device 1002 (e.g., in a library of digital works stored on the electronic device 1002). In other examples, the library used to generate the library view interface may extend to some or all of the digital works maintained by the digital work provider (e.g., in a library of digital works of the digital work provider). In still other implementations, the library view may be selectable, providing a user with a view for digital works contained on the device or a view for all digital works maintained by the digital work provider.

Figure 17:
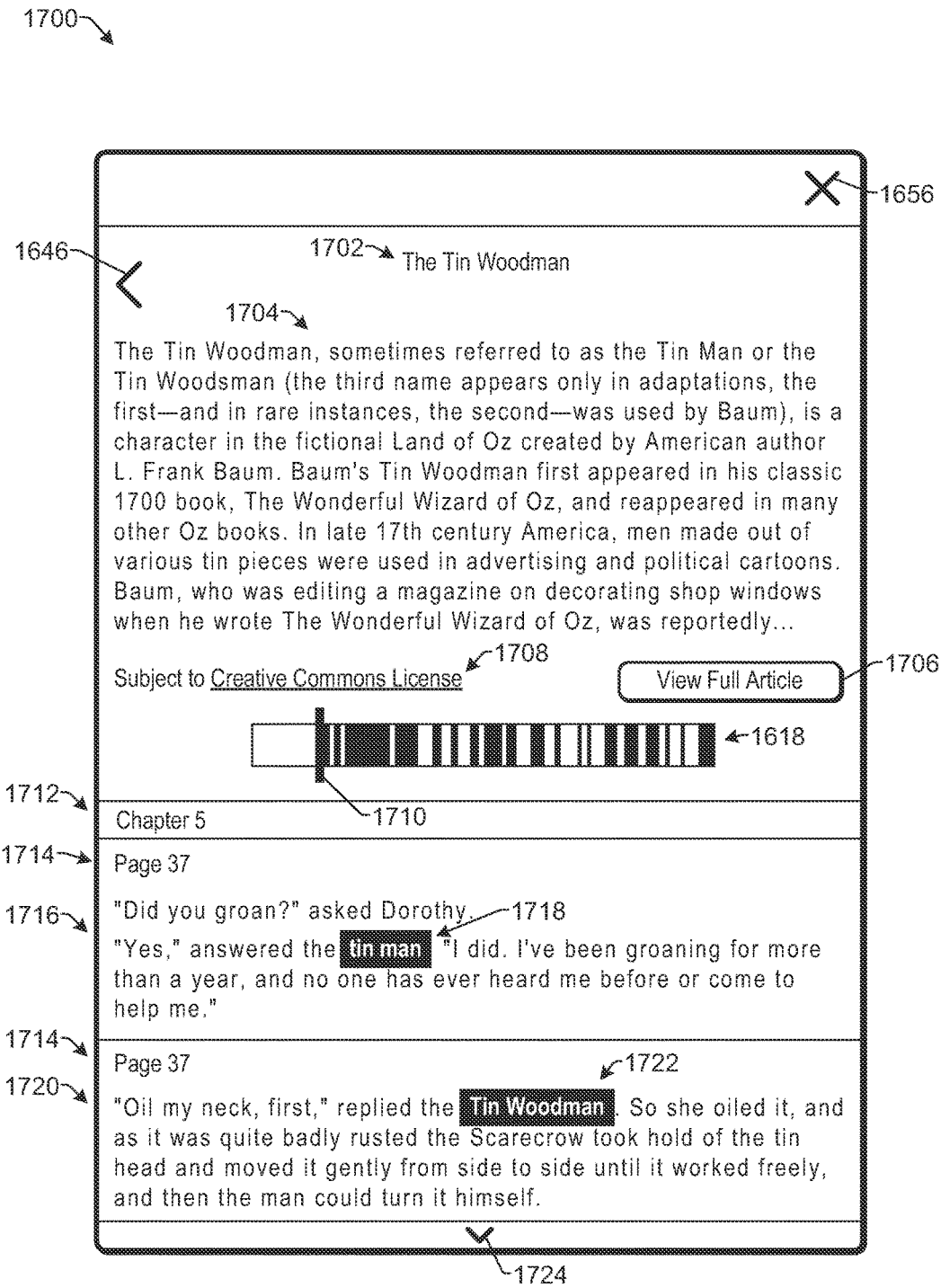
FIG. 17 illustrates an example interface for providing supplemental information, depicting a supplemental content view interface according to some implementations.

FIG. 17 illustrates a supplemental information view user interface 1700 that the user may navigate to, such as from the user interface 1600 discussed above with respect to FIG. 16. For example, from the interface 1600, the user may select the object Tin Woodman, such as by tapping, double clicking, etc., and be presented with the supplemental information view user interface 1700. The supplemental information view user interface 1700 includes the name of the object 1702, and may include prestored content 1704 obtained in advance from an authoritative source and provided by the digital work provider as part of the supplemental information provided for the corresponding digital work 1006. Several examples of sources from which the prestored content may be obtained include online sources, such as Wikipedia®, Shelfari® and IMDb®, as well as other encyclopedias, reference books, websites, and the like, depending on the subject matter of the digital work being analyzed and supplemented.

Accordingly, the digital work provider may obtain a limited amount of information about the object 1702, such as an excerpt from an online source, to provide as prestored content 1704 with the supplemental information for a particular digital work. The digital work provider may also provide a link 1706 to the full article at an online source to enable the user to access additional information on the object 1702 if the user so desires and currently has network access. Accordingly, the user may view the full article on the object 1702 by selecting the link 1706 or the like. Additionally, the digital work provider 1004 may include a link 1708 to license information related to the prestored content 1704.

In other implementations, as an alternative to displaying the prestored content 1704, the supplemental information view interface 1700 may instead display one or more links to online sources of information about the selected object. In some examples, no prestored content 1704 is included with the supplemental information and instead the supplemental information may include one or more links or reference identifiers for sources of information or content about the selected object. For example, each displayed link may be selected by a user to access a network accessible resource that provides information about the selected object, such as descriptive text, an image, an audio clip, a video clip, and so forth. As another example, when the supplemental information view user interface 1700 is accessed, a module on the electronic device 1002 (e.g., a supplemental information display module, as described below) may access information from a network accessible resource to obtain and automatically display the information about the selected object in the supplemental information view user interface 1700. Thus, rather than relying on prestored content, the supplemental information view user interface 1700 may dynamically display content about the selected object retrieved from an online source. For example, the content may be retrieved from any of the online sources discussed above, from the digital work provider, or various other network accessible resources, either automatically or in response to a user selection of a displayed reference identifier (i.e., a link, a URL), or selection of a button or control that causes access to the network accessible resources. These implementations may reduce the frequency of updates to the prestored content since the latest content on information about the selected object will be obtained when the supplemental information view user interface 1700 is accessed. In some cases, however, updates to the reference identifiers that link to the network accessible resources may be still be made, such as when a URL changes, or if additional sources of information about the object become available.

Furthermore, the supplemental information view user interface 1700 may also provide the visual representation 1618 corresponding to the object 1702, and which may include a slider 1710 in a position that corresponds to text from one or more excerpts from the book listed below the visual representation 1618. For example, the supplemental information view user interface 1700 may provide the chapter 1712 and page number 1714 for each excerpt from the text of the digital work 1006. Accordingly, when the slider 1710 is positioned at the beginning of the visual representation 1618, such as at the leftmost marking, a first excerpt 1716 may include the first occurrence of the object Tin Woodman in the digital work, and may highlight the occurrence in the excerpt as indicated at 1718. Similarly, the second excerpt 1720 may include the second occurrence of the object Tin Woodman in the digital work and may highlight the occurrence in the excerpt, as indicated at 1722. Accordingly, the user may scroll down using the scroll down control 724 to view additional excerpts corresponding to the current location of the slider 1710. Further, the user may select and slide the slider left or right along the visual representation 1618 to view other excerpts from the book having occurrences of the object Tin Woodman therein. Furthermore, the user may select the left arrow 1646 to return to the previous user interface such as the page view user interface 1600 described above. Additional examples of user interfaces are described in U.S. patent application Ser. No. 13/246,759, filed Sep. 27, 2011, the entire disclosure of which is incorporated herein by reference.

Example Framework for Displaying Supplemental Information

Figure 18:
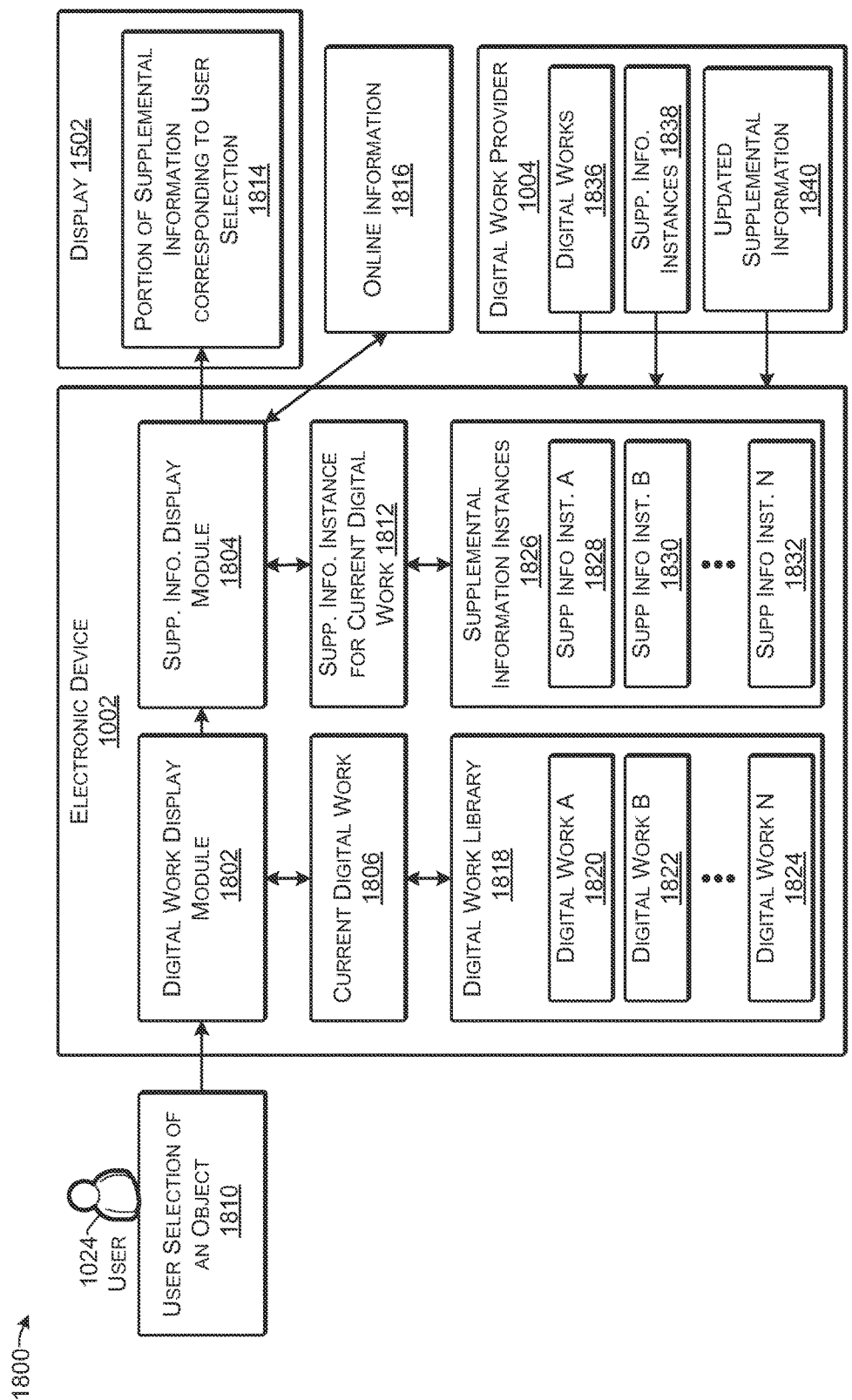
FIG. 18 illustrates an example framework for displaying supplemental information on an electronic device according to some implementations.

FIG. 18 illustrates an example framework 1800 for displaying supplemental information in connection with a digital work according to some implementations. In the example of FIG. 18, the electronic device 1002 includes a digital work display module 1802 and a supplemental information display module 1804. In some implementations, the digital work display module 1802 and the supplemental information display module 1804 may be separate modules. In other implementations, the digital work display module 1802 and the supplemental information display module 1804 may both be part of the same application or computer program for displaying content on the electronic device 1002. In yet other implementations, the digital work display module 1802 and the supplemental information display module 1804 may represent different functionalities of the same module.

As one example, the digital work display module 1802 may display a current digital work 1806 on the display 1502. In some examples, as mentioned above, the display 1502 may be part of the electronic device 1002, and/or unitary with the electronic device 1002. In other implementations, the display 1502 may be separate from the electronic device 1002 and connected to the electronic device 1002. In either case, the digital work display module 1802 may render the current digital work 1806 on the display 1502 for viewing by a user 1024.

As an example, while the digital work display module 1802 is displaying the current digital work 1806, the electronic device 1002 may receive a user selection 1810 of an object displayed in the current digital work 1806, as discussed above with reference to FIG. 15. In response, in some implementations, the supplemental information display module 1804 may be executed to provide a supplemental information instance 1812 in connection with the selected object of the current digital work 1806, such as described above with reference to the examples of FIGS. 15-17. The supplemental information instance 1812 may correspond to the supplemental information instance 1010 and structure 1400 described above. For example, the supplemental information display module 1804 may access the supplemental information instance 1812 available for the current digital work 1806, and may provide at least a portion 1814 of supplemental information corresponding to the user selection to be rendered on the display 1502, such as in a window, overlay, pop up, or other user interface or image displayed on the display 1502.

Additionally, in some implementations, the supplemental information display module 1804 may access online information 1816 when providing the portion 1814 of supplemental information. For example, if the user 1024 requests additional information with respect to prestored content, such as by clicking on a provided link, the supplemental information display module 1804 may retrieve the online information from a network location, such as a uniform resource locator (URL), or other network location or repository. Examples of sources of such online information 1816 include, but are not limited to Wikipedia®, Shelfari®, and IMDb®), as well as numerous other online sources. Additionally, in some implementations, the supplemental information display module 1804 may display links to online sources of information in place of or in addition to the prestored content. Further, in some instances, the supplemental information display module 1804 may dynamically obtain information about a selected object from one or more online sources of information or other network accessible resources in response to the user selection of the object.

In some examples, the electronic device 1002 may include a digital works library 1818, which may include one or more digital works, such as a digital work A 1820, a digital work B 1822, . . . , a digital work N 1824, and so forth. The electronic device 1002 may also include a supplemental information instances 1826, which may include supplemental information corresponding to the digital works in the digital work library 1818, and which may correspond to the supplemental information instance 1010 and structure 1400 described above. In some implementations, a separate instance of supplemental information may be provided for each digital work 1820-1824. Accordingly, supplemental information instance A 1828 may correspond to the digital work A 1820, supplemental information instance B 1830 may correspond to the digital work B 1822, . . . , supplemental information instance N 1832 may correspond to the digital work N 1824, and so on. For example, the supplemental information instance A 1828 may have been received by the electronic device 1002 in connection with the accessing or downloading of the digital work A 1820, such as from a digital work provider 1004. Thus, the digital work provider 1004 may provide digital works 1836 and corresponding supplemental information instances 1838 for each digital work 1836 to a plurality of electronic devices 1002 of a plurality of users 124.

Additionally, in some implementations, the digital work provider 1004 may provide the digital work and corresponding supplemental information to an intermediary, such as a wireless network provider (not shown) or the like, that, in turn, provides the digital work and corresponding supplemental information to particular electronic devices 1002. For purposes of this disclosure, "providing" by the digital work provider may include any intermediaries that perform delivery of the digital works and/or supplemental information.

In addition, the digital work provider 1004 may provide updated supplemental information 1840 to the electronic device 1002 on a one-time or periodic basis. For example, the supplemental information for one or more digital works stored on the electronic device 1002 may include prestored content that provides information on one or more objects in the digital work. Such prestored content may be updated at the original source, and thus, the digital work provider may provide updated supplemental information 1840 to the electronic device 1002 to reflect the change or update at the original source. Furthermore, other portions of the supplemental information may also change over time. For example, as new digital works are produced, objects in previous digital works may be discussed, used or referenced in the new digital works. Thus, in some examples, the supplemental information for existing digital works may be updated to include references to, or instances of, objects in newer digital works, such as for presenting the library view described above. Various other types of updates to the supplemental information may be provided by the digital work provider, with the foregoing being just several examples. In addition, in some implementations, the supplemental information display module 1804 on the electronic device 1002 may independently seek out and obtain updates to the supplemental information, such as from the digital work provider and/or other online sources.

To control the frequency of updates to the supplemental information, the digital work provider may apply one or more policies to determine whether changes to the prestored content, the reference identifiers, or other supplemental information are significant enough to warrant the distribution of updated supplemental content. For example, with respect to the prestored content, the digital work provider 1004 may determine whether the content has been changed by a predetermined threshold amount. The digital work provider 1004 may also consider other factors associated with the prestored content and the source of the prestored content, such as whether the source of the prestored content indicates that an error in the content has been corrected. Further, with respect to other types of updates to the supplemental information, various thresholds or policies may be similarly applied to determine whether to provide an update to the supplemental information for a particular digital work.

Additionally, in some implementations, crowd sourcing may be used to assist in correcting errors in alternate names, locations of objects in a digital work, and other automated decisions. For example, users may be provided the opportunity to correct or augment the supplemental information. In some instances, the author of the digital work may also be provided the opportunity to provide information regarding alternate names and other information, such as selection of significant phrases, locations of occurrences of particular objects, identification of scenes, and the like, depending on the nature of the digital work.

Example System Architecture

Figure 19:
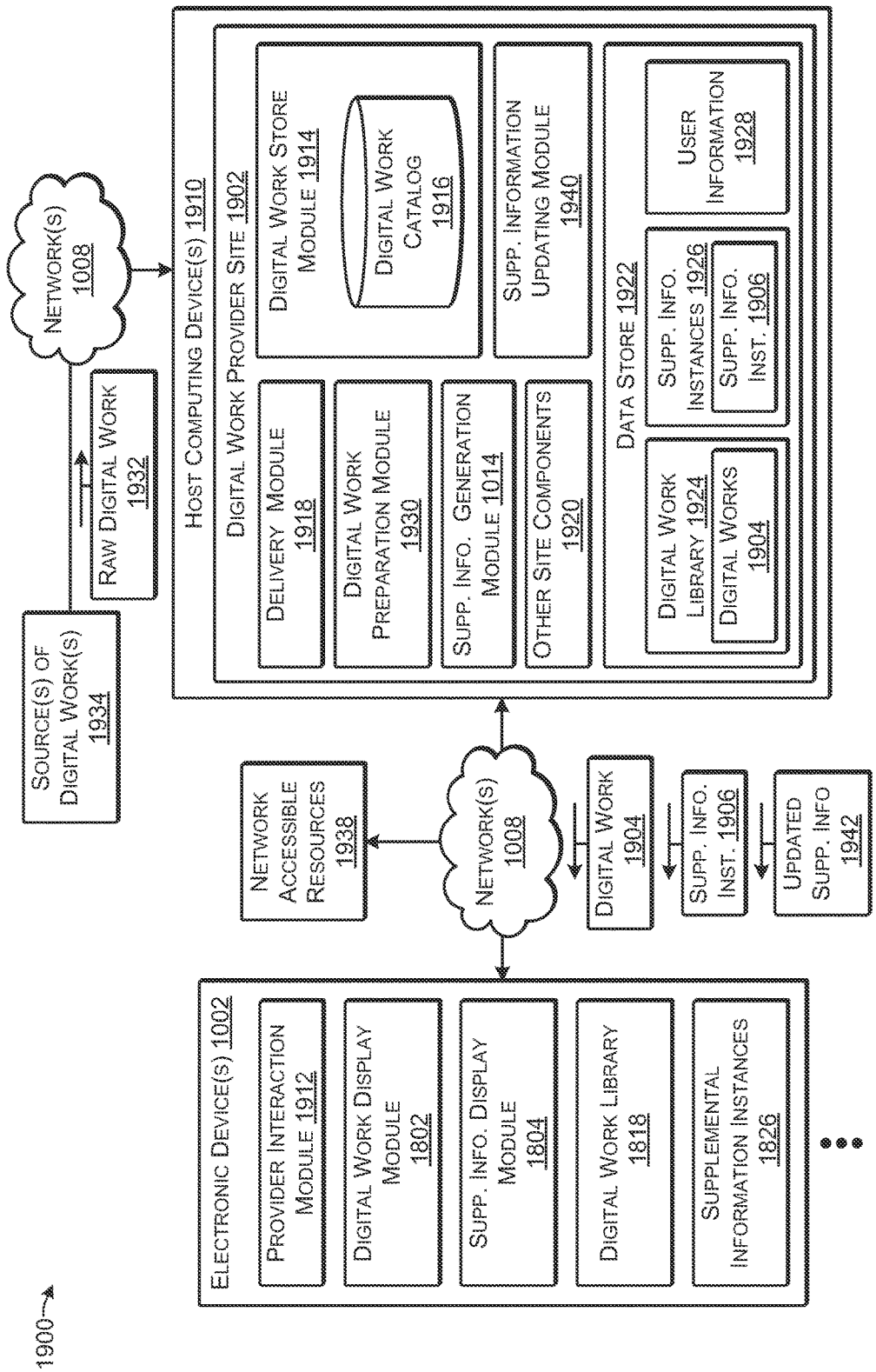
FIG. 19 illustrates an example architecture of a system for providing supplemental information for a digital work according to some implementations.

FIG. 19 illustrates an example architecture of a system 1900 including a digital work provider site 1902 for providing one or more digital works 1904 and corresponding supplemental information instance 1906 to one or more electronic devices 1002 according to some implementations. As one example, the digital work provider site 1902 may be a merchant website, an e-commerce site, or the like, that offers digital works to the public. In some implementations, the digital work provider site 1902 may offer digital works 1904, such as books, magazines, newspapers, songs, movies, and so forth, to the public through a website, other type of electronic commerce site, an online location, or the like. In some examples, the digital work provider site 1902 may alternatively, or additionally, provide digital works through an online or mobile application executing on the electronic device 1002. For example, an application on the electronic device 1002 may connect to or obtain content from the digital work provider site 1902 to enable the purchase or management of digital works, and the like. Thus, the digital work provider site 1902 may enable an electronic device 1002 to access digital works 1904 through an online or mobile application executing on a mobile device, such as an eBook reader, smart phone, tablet computing device, or the like. Accordingly, the digital work provider site 1902 is not limited to a website accessed by a browser, but may encompass other technologies for obtaining digital works, such as through in-application shopping, and the like.

The digital work provider site 1902 is able to communicate with one or more electronic devices 1002 and one or more users 124 through one or more networks 1008. For example, the network(s) 1008 may include a local area network (LAN), a wide area network (WAN), such as the Internet, or any combination thereof, and may include both wired and wireless communication technologies using any suitable protocols and communication techniques. The digital work provider site 1902 and the electronic device 1002 may communicate and interact with one another using any combination of suitable communication and networking protocols, such as Internet protocol (IP), transmission control protocol (TCP), hypertext transfer protocol (HTTP), and so forth.

In some implementations, the digital work provider site 1902 may be hosted on one or more host computing devices 1910. As one example, the host computing device(s) 1910 may be one or more web servers located at a data center, server farm, or other single physical location. In other examples, the digital work provider site 1902 or portions thereof may be located in diverse locations that are physically remote from one another. Further, in some implementations, the digital work provider site 1902 may be a group of websites, data stores, services, and the like, hosted on a plurality of different host computing devices 1910 in a plurality of diverse locations, or hosted by one or more host computing devices 1910 at a single location.

In the illustrated example, the electronic device 1002 may include the digital work display module 1802, the supplemental information display module 1804, the digital work library 1818, and the supplemental information instances 1826, as discussed above with reference to FIG. 18. The electronic device 1002 may further include a provider interaction module 1912, which in some instances may be an application, such as a web browser, mobile application, or other module or computer program configured to receive web content, webviews, online content, or the like, for accessing and interacting with the digital work provider site 1902. For example, the provider interaction module 1912 may enable the user 1024 to shop for digital works at the digital work provider site 1902 and access or receive digital works 1904 from the digital work provider site 1902, such as by downloading through the network(s) 1008. Further, in some implementations, the provider interaction module 1912 may enable the user 1024 to organize or manage the digital works on the electronic device 1002, while in other implementations, a separate management module (not shown) may provide this functionality.

The digital work provider site 1902 may include a digital work store module 1914 that may provide or may access a digital work catalog 1916. For example, the digital work store module 1914 may present the digital work catalog 1916 to an electronic device 1002 that accesses the digital work provider site 1902 to shop for a digital work 1904. The digital work catalog 1916 may include searchable and/or browsable listings and descriptions of digital works 1904 available from the digital work provider site 1902. The digital work store module 1914 may communicate with the provider interaction module 1912 on the electronic device 1002 to enable the user 1024 to locate and acquire a digital work from the digital work provider site 1902.

The digital work provider site 1902 may further include a delivery module 1918 that may deliver a digital work to the electronic device 1002 and/or the user 1024. For example, in some instances, the delivery module 1918 may facilitate the download of a digital work to the electronic device 1002 over the network(s) 1008. In other instances, the delivery module 1918 may provide for delivery of a hard copy of the digital work to the user, such as by delivery of a recording medium that maintains a copy of the digital work, depending on the nature of the digital work and the electronic device 1002.

Furthermore, in some implementations, the delivery module 1918 may refer to the user information 1928 to determine one or more digital works 1904 to download to the electronic device 1002. For example, a user 1024 may have purchased or otherwise accessed digital works 1904 from the digital work provider site 1902 in the past. The user 1024 may acquire a new electronic device 1002 and desire to have the previously purchased digital works 1904 accessible on the new electronic device 1002. Consequently, the delivery module 1918 may deliver the previously purchased digital works 1904 to the new electronic device 1002 and, contemporaneously, may also deliver the supplemental information instance 1906 corresponding to each of the digital works 1904 delivered to the new electronic device 1002, such as before, during or after delivery of the previously purchased digital works 1904. For example, the user information 1928 may include account information, a purchase history, a user library, or other records of digital works of the user 1024, such as with respect to a first electronic device 1002. Subsequently, when the user 1024 acquires a second electronic device 1002, the delivery module 1918 may refer to the user information 1928 to determine, at least in part, digital works and related supplemental information to download to the second electronic device 1002.

The digital work provider site 1902 may also include various other site components 1920, as is known, depending on the design and intended use of the digital work provider site 1902. For example, the other site components 1920 may include one or more pages of content, such as webpages, webviews, or other online content, that may be presented to the user 1024 through the provider interaction module 1912, such as during shopping for digital works from the digital work provider site 1902.

The digital work provider site 1902 may include or may access one or more data stores 1922 that include a digital work library 1924, supplemental information instances 1926, and user information 1928. For example, the digital work library 1924 may include a plurality of digital works 1904 that the digital work provider has available for access by the user 1024, such as by purchase through the digital works catalog 1916. The supplemental information instances 1926 may include a supplemental information instance 1906 for at least some of the digital works 1904 in the digital work library 1924. For example, the digital work provider site may generate the supplemental information instance 1906 for the digital works 1904 in the digital work library 1924 to provide the interfaces and information described above with reference to FIGS. 16-17. Further, the user information 1928 may include information for a plurality of users 124 of the digital work provider site 1902. For example, the user information 1928 may include account information for each user for identifying and interacting with the user, such as name, email address, mailing address, telephone number, user identification (ID) number, user purchase history (e.g., digital works acquired by the user) so forth.

The digital work provider site 1902 may also include a digital work preparation module 1930 that may receive raw digital works 1932 from one or more sources of digital works 1934. For example, the sources of digital works 1934 may be publishers, authors, movie distributors, studios, music companies, artists, and so forth. In the case of textual digital works, the digital work preparation module 1930 may receive a raw digital work 1932 from the publisher, author, or other source of digital works 1934, and may parse and process the raw digital work 1932 to make the digital work compatible with various display formats, device platforms, and so forth. For example, the digital work preparation module 1930 may identify the start location and end location of pages, paragraphs, sentences, and other information in the digital work, and may produce metadata for the digital work that identifies the digital work and the properties of the digital work to enable rendering of the digital work on an electronic device 1002.

The digital work provider site 1902 may further include a supplemental information generation module 1014, which may operate on the digital works 1904 in the digital works library 1924 to produce the supplemental information instance 1906. For example, the supplemental information generation module 1014 may select a particular digital work 1904 from the digital work library 1924 for generating supplemental information instance 1906 for the particular digital work 1904. The supplemental information generation module 1014 may parse and index the digital work by identifying characters, people, things, phrases, places and so forth that are of significance in the digital work. In some examples, the supplemental information generation module 1014 may access various authoritative sources of information, as well as performing statistical analysis and modeling to identify the significant objects in the particular digital work 1904. Thus, during the parsing, the supplemental information generation module 1014 may identify candidate objects that are candidates to make into objects for the digital work, such as by identifying proper names, place names, statistically improbable phrases, and the like, in the text of the digital work. For instance, a statistically improbable phrase is a word or combination of words that occur in the text of a digital work one or more times in a manner that is out of a predetermined threshold. For example, if a particular phrase is used multiple times in a digital work, while not being used or being used rarely in other digital works, this may be a statistically improbable phrase that is a candidate to become an object of the digital work.

To determine which candidate objects to make into objects, the supplemental information generation module 1014 may access other sources of information outside the digital work. For example, the supplemental information generation module 1014 may access network accessible resources 1938 that may include online sources of information, such as Wikipedia®, Shelfari® and IMDb®, online dictionaries, or other online resources, to determine identification of characters and other significant phrases, things, events or places in a digital work 1904. Further, the supplemental information generation module 1014 may obtain additional information on the statistically improbable phrases in the particular digital work 1904, such as by obtaining definitions or other information for these phrases from various locations, such as the authoritative sources mentioned above.

Following identification of the objects in the digital work, the supplemental information generation module 1014 may identify or obtain, where available, excerpts with respect to identified objects in the particular digital work from the authoritative sources. For example, the supplemental information generation module 1014 may obtain content on an object, such as an excerpt from a Wikipedia® article, a Shelfari® or IMDb® page, or the like, to include with the supplemental information instance 1906 as prestored content for the objects identified in the particular digital work 1904. In other examples, the supplemental information generation module 1014 identifies the location of the content containing information about the object and includes a reference identifier to a network location of the content, rather than the content itself, with the with supplemental information.

The supplemental information instance 1906 generated for each digital work may be stored in the supplemental information instances 1926. When the user 1024 acquires a particular digital work 1904, such as through interaction with the digital work store module 1914, the delivery module 1918 may deliver the particular digital work 1904 to the electronic device 1002, and may also deliver the corresponding supplemental information instance 1906 for the particular digital work. For example, the particular digital work 1904 and the corresponding supplemental information instance 1906 may be downloaded contemporaneously from the digital work provider site 1902, e.g., as a package or as a sequential download.

Further, as mentioned above with respect to FIG. 18, updated supplemental information may also be provided for delivery to the electronic device 1002 for the digital works stored on the electronic device 1002, such as during one-time updates or at regular interval updates. The digital work provider site 1902 may include a supplemental information updating module 1940 that checks for updates to the supplemental information instance 1906. For example, the supplemental information updating module 1940 may check for updates to the digital work library 1924 that may necessitate updating a supplemental information index, such as to expand a library view of particular objects to include newly added digital works. Further, the supplemental information updating module 1940 may check for changes to prestored content in the supplemental information instance 1906 and/or may determine that links or network locations for new sources of information about objects in the supplemental information are available. For example, the supplemental information updating module 1940 may update the supplemental information instance 1906 for a digital work to include updated prestored content, new prestored content, or new or different reference identifiers to online sources of information about an object. Further, as mentioned above with reference to FIG. 18, the supplemental information updating module 1940 may apply one or more policies, thresholds, or the like, to determine whether the changes to the prestored content, reference identifiers, or other supplemental information are significant enough to warrant the distribution of updated content.

When supplemental information instance 1906 for a particular digital work 1904 is updated an amount significant enough to merit distribution of updated supplemental information, the supplemental information updating module 1940 may use user information 1928 to determine one or more electronic devices 1002 that have an older version of the supplemental information. The supplemental information updating module 1940 may make updated supplemental information 1942 available for delivery to the one or more electronic devices 1002 to update the supplemental information on those electronic devices 1002. The delivery module 1918 may deliver the updated supplemental information 1942, or may provide the updated supplemental information 1942 to an intermediary that performs the delivery.

Example Electronic Device

Figure 20:
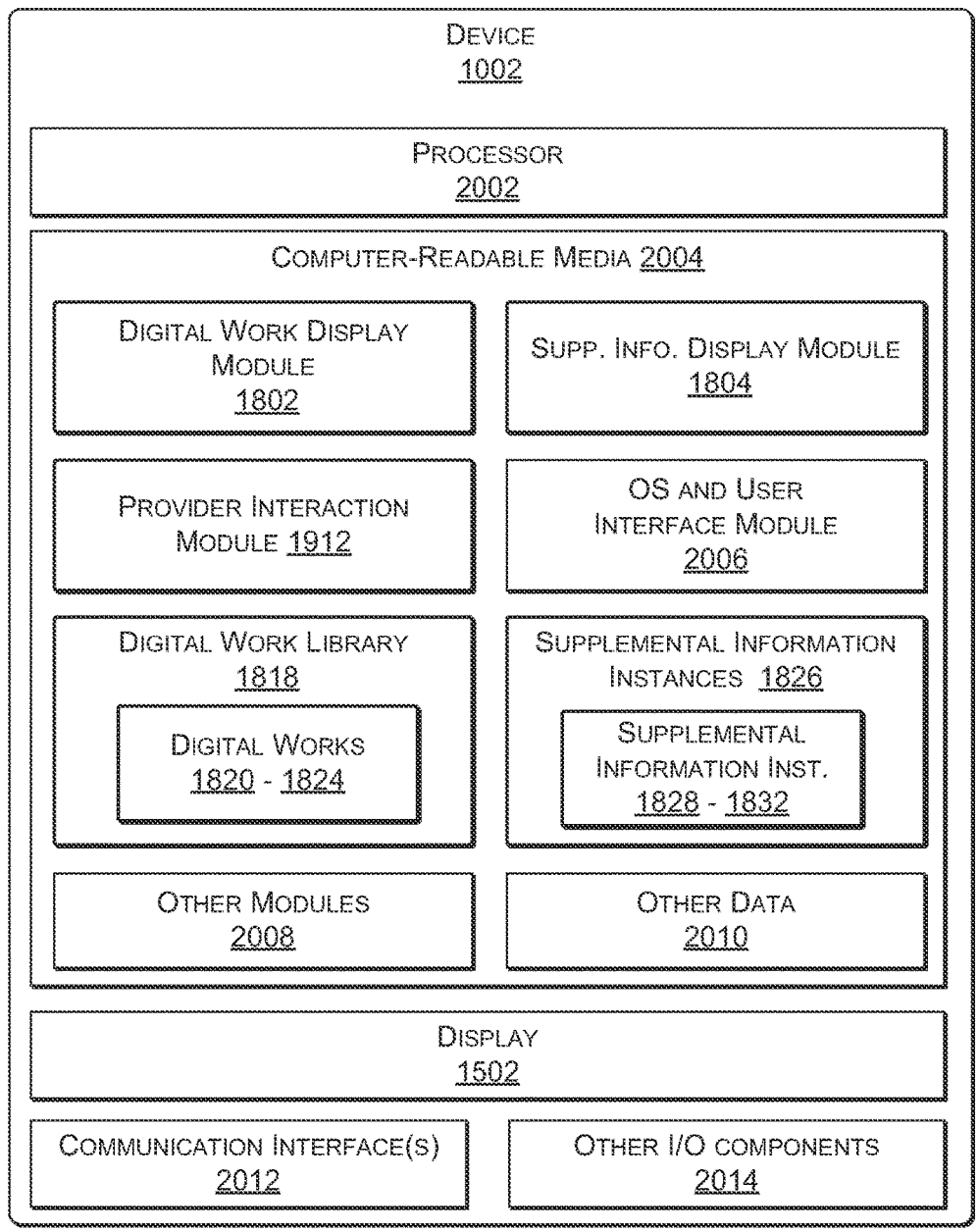
FIG. 20 illustrates select components of an example electronic device according to some implementations.

FIG. 20 illustrates select example components of the electronic device 1002 that may be used to implement the functionality described above according to some implementations. In a very basic configuration, the electronic device 1002 includes, or accesses, components such as at least one processor 2002 and a computer-readable media 2004. Each processor 2002 may itself comprise one or more processors or cores. Depending on the configuration of the electronic device 1002, the computer-readable media 2004 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 2002 directly or through another computing device. Accordingly, the computer-readable media 2004 may be computer-readable media able to maintain instructions, modules or components executable by the processor 2002.

The computer-readable media 2004 may be used to store any number of functional components that are executable by the processor 2002. In some implementations, these functional components comprise instructions or programs that are executable by the processor 2002 and that, when executed, implement operational logic for performing the actions attributed above to the electronic device 1002. Functional components of the electronic device 1002 stored in the computer-readable media 2004 may include the digital work display module 1802 and the supplemental information display module 1804, as described above, which may be executed on the processor 2002 for displaying the digital works 1820-1824 and supplemental information instances 1828-1832 for the digital works 1820-1824, respectively. Additional functional components stored in the computer-readable media 2004 may include the provider interaction module 1912, executable by the processor 2002 for obtaining the digital works 1820-1824 and the corresponding supplemental information instances 1828-1832 from the digital work provider site 1902. Other functional components may include an operating system and user interface module 2006 for controlling and managing various functions of the electronic device 1002. Depending on the type of the electronic device 1002, the computer-readable media 2004 may also optionally include other functional components, such as other modules 2010, which may include applications, programs, drivers and so forth.

The computer-readable media 2004 may also store data, data structures, and the like that are used by the functional components. For example, data stored by the computer-readable media 2004 may include the digital work library 1818, containing the digital works 1820-1824, and the supplemental information instances 1826, containing the supplemental information instances 1828-1832. The electronic device 1002 may also include other data 2010, which may include, for example, data used by the provider interaction module 1912, the operating system and user interface 2006, and the other modules 2008. Further, the electronic device 1002 may include many other logical, programmatic and physical components, of which those described are merely examples that are related to the discussion herein.

FIG. 20 further illustrates the display 1502, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 1502 may be an active display such as a liquid crystal display, plasma display, light emitting diode display, organic light emitting diode display, and so forth. These displays may comprise drive electronics, such as a display drive matrix configured to affect individual pixels within the display 1502. Additionally, in some implementations, the display 1502 may be a 3D display capable of providing a 3D image. For example, the display 1502 may produce a 3D image by providing alternating left-eye and right-eye images with or without the use of shuttering or filtering eyeglasses. Accordingly, in some implementations, the visual representations and other user interface components herein may be rendered in 3D.

One or more communication interfaces 2012 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interface 2012 may allow a user of the electronic device 1002 to access the World Wide Web, download digital works and supplemental information from the digital work provider site 1902, access supplemental online content, such as a from a website or other network location, and the like. The communication interface 2012 may further allow a user to access storage on another device, such as a user's computing device, a network attached storage device, or the like.

The electronic device 1002 may further be equipped with various other input/output (I/O) components 2014. Such I/O components may include a touchscreen and various user controls (e.g., buttons, a joystick, a keyboard, a mouse, etc.), speakers, a microphone, a camera, connection ports, and so forth. For example, the operating system 2006 of the electronic device 1002 may include suitable drivers configured to accept input from a keypad, keyboard, or other user controls and devices included as the I/O components 2014. For instance, the user controls may include page turning buttons, navigational keys, a power on/off button, selection keys, and so on. Additionally, the electronic device 1002 may include various other components that are not shown, examples of which include removable storage, a power source, such as a battery and power control unit, a global positioning system (GPS) device, a PC Card component, and so forth.

Example Computing Devices

Figure 21:
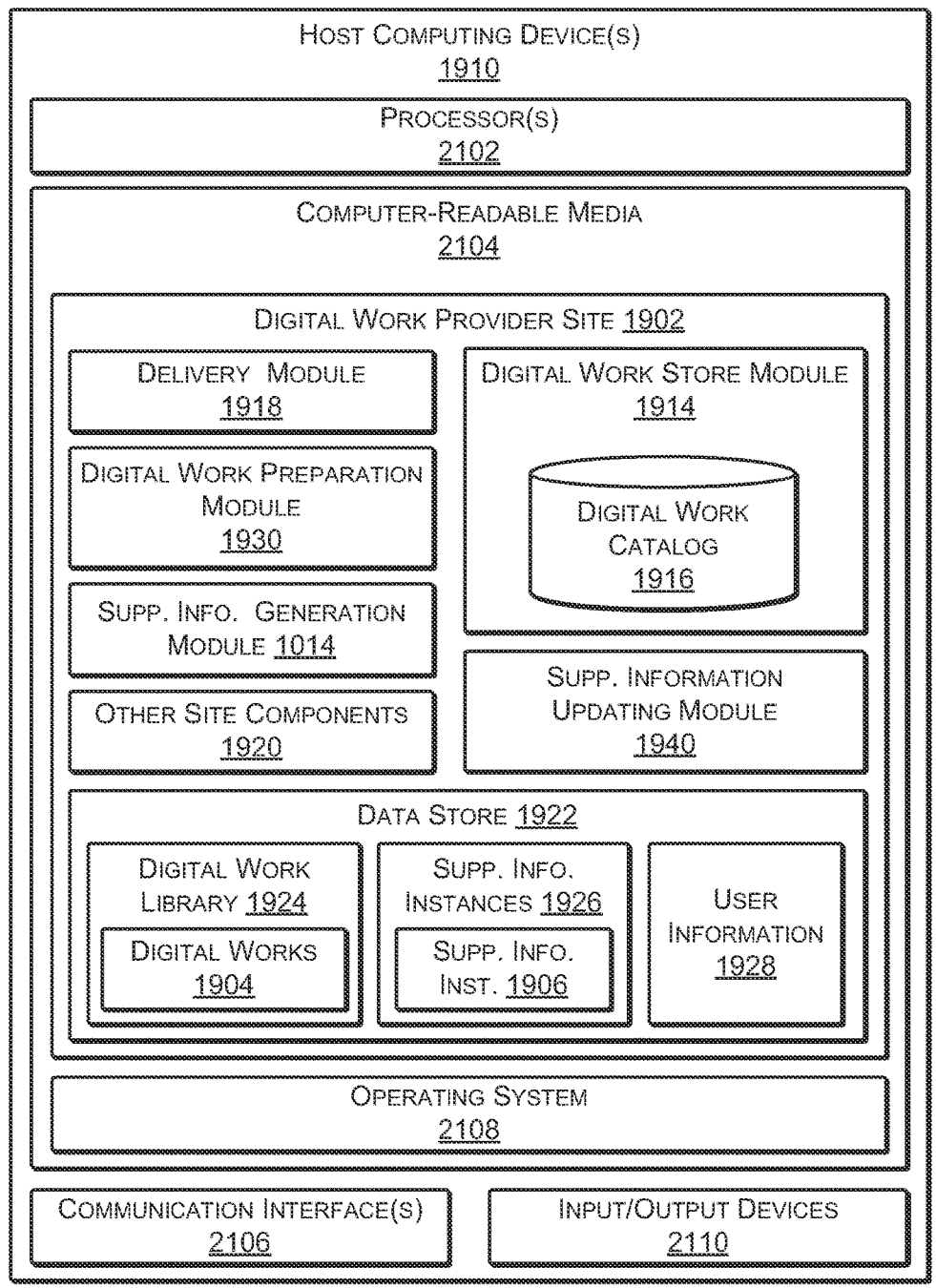
FIG. 21 illustrates select components of one or more example host computing devices of a digital work provider according to some implementations.

FIG. 21 illustrates select components of one or more host computing devices 1910 that may be used to implement the functionality of the digital work provider site 1902 according to some implementations. The digital work provider site 1902 may be hosted on one or more servers or other types of computing devices that may be embodied in any number of ways. For instance, in the case of a server, the digital work provider site 1902 may be implemented on a single server, a cluster of servers, a server farm or data center, a cloud hosted computing service, and so forth, although other computer architectures (e.g., a mainframe architecture) may also be used. Further, while the figures illustrate the components of the digital work provider site 1902 as being present in a single location, it is to be appreciated that these components may be distributed across different computing devices and locations in any manner. Generally, the digital work provider site 1902 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

As illustrated in FIG. 21, an example host computing device 1910 includes one or more processors 2102, a computer-readable media 2104, and one or more communication interfaces 2106. The processor(s) 2102 may be a single processing unit or a number of processing units, and may include single or multiple computing units or multiple cores. The processor(s) 2102 can be configured to fetch and execute computer-readable instructions stored in the computer-readable media 2104 or other computer-readable media.

The computer-readable media 2104 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 1910, the computer-readable media 2104 may be a type of computer-readable storage media and may be a non-transitory storage media.

The computer-readable media 2104 may be used to store any number of functional components that are executable by the processors 2102. In many implementations, these functional components comprise instructions or programs that are executable by the processors 2102 and that, when executed, implement operational logic for performing the actions attributed above to the digital work provider site 1902. Functional components of the digital work provider site 1902 that may be executed on the processors 2102 for implementing the various functions and features related to providing digital works and supplemental information, as described herein, include the digital work store module 1914, the delivery module 1918, the digital work preparation module 1930, the supplemental information generation module 1014, and the supplemental information updating module 1940. Additional functional components stored in the computer-readable media 2104 may include the other site components 1920, and an operating system 2108 for controlling and managing various functions of the host computing device(s) 1910. In addition, the computer-readable media 2104 may include, or the host computing device(s) 1910 may access, the data store(s) 1922, which may include the digital work library 1924, including the digital works 1904, the supplemental information instances 1926, including the supplemental information instance 1906, and the user information 1928. In addition, the computer-readable media 2104 may store or the host computing devices(s) 1910 may access the digital work catalog 1916 used by the digital work store module 1914. The host computing device(s) 1910 may also include many other logical, programmatic and physical components, of which those described above are merely examples that are related to the discussion herein.

The communication interface(s) 2106 may include one or more interfaces and hardware components for enabling communication with various other devices, such as the electronic devices 1002, over the network(s) 1008. For example, communication interface(s) 2106 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 1008 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Host computing device(s) 1910 may further be equipped with various input/output devices 2110. Such I/O devices 2110 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. One or more non-transitory computer-readable media maintaining instructions executable by one or more processors to perform operations comprising:
   extracting text from a digital work;
   identifying a plurality of noun phrases from the text extracted from the digital work;
   searching a network accessible resource having a plurality of entries to identify a set of one or more entries in the network accessible resource that contain information related to at least one noun phrase of the plurality of noun phrases, wherein each noun phrase corresponding to an entry in the set of one or more entries is a candidate topic in a set of candidate topics;
   ranking the candidate topics based, at least in part, on at least one of a number of incoming links or a number of outgoing links between each of the entries corresponding to the candidate topics;
   excluding, from the set of candidate topics, one or more candidate topics ranked below a first threshold;
   comparing a first term frequency-inverse document frequency (tf-idf) value with a second tf-idf value, wherein the first tf-idf value is determined with respect to the digital work for each candidate topic remaining in the set of candidate topics, and wherein the second tf-idf value is determined for the candidate topics with respect to a corpus of works;
   excluding, from the set of candidate topics, one or more candidate topics for which a difference between the first tf-idf value and the second tf-idf value is less than a second threshold;
   generating a digital supplemental information file comprising at least one reference to supplemental information relating to at least one candidate topic remaining in the set of candidate topics;
   receiving a request for the digital supplemental information file from an electronic device; and
   transmitting the digital supplemental information file to the electronic device, the digital supplemental information file to cause the digital work to include at least one selectable portion that enables display of the at least one reference to supplemental information and a visual representation of at least a location in the digital work of each occurrence of the at least one candidate topic remaining in the set of candidate topics, wherein the visual representation comprises an object with markings corresponding to each occurrence.

2. The one or more computer-readable media as recited in claim 1, wherein the network accessible resource is at least one of:
   an online wiki-type site;
   an online encyclopedia site;
   an online dictionary site;
   a reference site; or
   a crowd-sourced information site.

3. The one or more computer-readable media as recited in claim 1, prior to ranking the candidate topics, the operations further comprising, for each entry in the set of one or more entries performing at least one of:
    determining if one or more other entries in the set of one or more entries link to the entry; and
    determining if the entry links to one or more other entries in the set of one or more entries.

4. The one or more computer-readable media as recited in claim 1, wherein the supplemental information comprises at least a location in the digital work of each occurrence of each candidate topic in the set of candidate topics.

5. The one or more computer-readable media as recited in claim 4, wherein the supplemental information further comprises content related to at least one candidate topic obtained from the set of one or more entries in the network accessible resource.

6. A method comprising:
    under control of one or more processors configured with executable instructions,
    searching a network accessible resource for at least one entry corresponding to at least one noun phrase obtained from a digital work;
    identifying the at least one entry;
    generating a set of candidate topics from the at least one noun phrase corresponding to the at least one entry identified;
    for at least one candidate topic of the set of candidate topics:
        comparing a first indication of a frequency of the at least one candidate topic in the digital work with a second indication of a frequency of the at least one candidate topic in a corpus of digital works, and
        removing the at least one candidate topic from the set of candidate topics based, at least partly, on a difference between the first indication and the second indication being less than a threshold amount;
    generating a digital supplemental information file comprising at least one reference to supplemental information relating to at least one candidate topic remaining in the set of candidate topics;
    receiving a request for the digital supplemental information file from an electronic device; and
    transmitting the digital supplemental information file to the electronic device, the digital supplemental information file to cause the digital work to include at least one selectable portion that enables display of the at least one reference to supplemental information and a visual representation of at least a location in the digital work of each occurrence of the at least one candidate topic remaining in the set of candidate topics wherein the visual representation comprises an object with markings corresponding to each occurrence.

7. The method as recited in claim 6, wherein the at least one entry in the network accessible resource contains information related to the at least one noun phrase.

8. The method as recited in claim 6, wherein the network accessible resource is at least one of:
    an online wiki-type site;
    an online encyclopedia site;
    an online dictionary site;
    a reference site; or
    a crowd-sourced information site.

9. The method as recited in claim 6, further comprising, for a plurality of noun phrases obtained from the digital work, identifying a plurality of entries in the network accessible resource, each entry corresponding to at least one noun phrase of the plurality of noun phrases.

10. The method as recited in claim 9, wherein the respective noun phrases are each a respective candidate topic in the set of candidate topics, the method further comprising, for a particular entry of the network accessible resource that corresponds to a particular candidate topic performing at least one of:
    determining that one or more other entries corresponding to one or more other candidate topics link to the particular entry; and
    determining that the particular entry links to one or more other entries that correspond to one or more other candidate topics; and
    ranking the candidate topics in the set of candidate topics based, at least in part, on the links to and from the entries corresponding to the candidate topics.

11. The method as recited in claim 10, wherein ranking the candidate topics is based, at least in part, on a page ranking of each of the entries corresponding to the candidate topics, wherein the page ranking is based, at least in part, on a probability of being directed to a particular entry of the entries corresponding to the candidate topics by selecting a random link in another entry corresponding to the candidate topics.

12. The method as recited in claim 10, wherein ranking the candidate topics is based, at least in part, on at least one of: a number of incoming links or a number of outgoing links between each of the entries corresponding to the candidate topics.

13. The method as recited in claim 10, further comprising, applying a ranking threshold to remove, from the set of candidate topics, one or more candidate topics ranked below the ranking threshold.

14. The method as recited in claim 13, further comprising retaining or rejoining, in the set of candidate topics, regardless of the ranking threshold, a candidate topic that corresponds to at least one of a place or an organization.

15. The method as recited in claim 9, wherein the respective noun phrases are each a respective candidate topic in the set of candidate topics, wherein:
    the first indication comprises a first term frequency-inverse document frequency (tf-idf) value and the second indication comprises a second tf-idf value, wherein the first tf-idf value is associated with each respective candidate topic with respect to the digital work, and the second tf-idf value is associated with each respective candidate topic with respect to the corpus of digital works; and
    the removing is based, at least partly, on a difference between the first tf-idf value and the second tf-idf value being less than the threshold amount.

16. The method as recited in claim 15, further comprising retaining or rejoining, in the set of candidate topics, regardless of the threshold, a candidate topic that corresponds to at least one of a place or an organization.

17. The method as recited in claim 6, wherein the at least one noun phrase has noun phrase location information associated therewith, the noun phrase location information identifying the location of each occurrence of the at least one noun phrase in the digital work.

18. The method as recited in claim 17, further comprising:
    parsing text of the digital work into a plurality of tokens, each token corresponding to at least one of a word or a punctuation mark;
    determining token location information for the tokens; and associating the noun phrase location information with each occurrence of the noun phrase in the digital work based, at least in part, on the token location information.

19. A system comprising:

one or more processors;

one or more computer-readable media; and one or more modules maintained on the one or more computer-readable media to be executed by the one or more processors to perform operations including:

obtaining a plurality of noun phrases from a digital work;

searching a network accessible resource having a plurality of entries to identify a set of one or more entries that correspond to one or more noun phrases of the plurality of noun phrases;

generating a set of candidate topics from the one or more noun phrases;

removing, from the set of candidate topics, at least one candidate topic based, at least partly, on a difference between a first indication of a frequency of the at least one candidate topic in the digital work and a second indication of a frequency of the at least one candidate topic in a collection of digital works being within a threshold;

generating a digital supplemental information file comprising at least one reference to supplemental information relating to at least one candidate topic remaining in the set of candidate topics;

receiving a request for the digital supplemental information file from an electronic device; and transmitting the digital supplemental information file to the electronic device, the digital supplemental information file to cause the digital work to include at least one selectable portion that enables display of the at least one reference to supplemental information and a visual representation of at least a location in the digital work of each occurrence of the at least one candidate topic remaining in the set of candidate topics wherein the visual representation comprises an object with markings corresponding to each occurrence.

20. The system as recited in claim 19, the operations further comprising:

determining entries in the set of one or more entries that link to other entries in the set of one or more entries;

creating the set of candidate topics from the one or more noun phrases that correspond to the entries in the set of one or more entries;

ranking the candidate topics based, at least in part, on links between the entries in the set of one or more entries; and removing from the set of candidate topics one or more candidate topics that rank below a ranking threshold based, at least in part, on the links between the entries in the set of one or more entries.

21. The system as recited in claim 19, the operations further comprising:

creating the set of candidate topics from the plurality of noun phrases that correspond to entries in the set of one or more entries;

parsing content of the entries in the set of one or more entries to identify entries that include, in the content, noun phrases corresponding to other entries in the set of one or more entries;

ranking the candidate topics based on, at least in part, for each entry in the set of one or more entries, a frequency in the content of each entry of noun phrases corresponding to other candidate topics; and removing from the set of candidate topics one or more candidate topics that rank below a ranking threshold based, at least in part, on the frequency of noun phrases corresponding to other candidate topics.

22. The system as recited in claim 19, wherein the first indication and the second indication comprise term frequency-inverse document frequencies (tf-idfs).

23. The system as recited in claim 19, the operations further comprising, prior to the searching, for each noun phrase containing two or more words, deriving additional smaller noun phrases by employing a backwards walk through the noun phrase.

24. The system as recited in claim 19, wherein the network accessible resource is at least one of:

an online wiki-type site;

an online encyclopedia site;

an online dictionary site;

a reference site; or a crowd-sourced information site.

25. The system as recited in claim 19, wherein the supplemental information further comprises information related to the at least one noun phrase obtained from at least one entry in the set of one or more entries.

\* \* \* \* \*